(12) United States Patent
Bomba et al.

(10) Patent No.: US 12,338,157 B2
(45) Date of Patent: Jun. 24, 2025

(54) METHODS AND APPARATUS FOR MANUFACTURING A GLASS RIBBON

(71) Applicant: Corning Incorporated, Corning, NY (US)

(72) Inventors: Richard Nicholas Bomba, Corning, NY (US); James Paul Peris, Horseheads, NY (US)

(73) Assignee: CORNING INCORPORATED, Corning, NY (US)

( * ) Notice: Subject to any disclaimer, the term of this patent is extended or adjusted under 35 U.S.C. 154(b) by 543 days.

(21) Appl. No.: 17/637,661

(22) PCT Filed: Sep. 4, 2020

(86) PCT No.: PCT/US2020/049307
§ 371 (c)(1),
(2) Date: Feb. 23, 2022

(87) PCT Pub. No.: WO2021/050366
PCT Pub. Date: Mar. 18, 2021

(65) Prior Publication Data
US 2022/0289613 A1    Sep. 15, 2022

Related U.S. Application Data

(60) Provisional application No. 62/899,450, filed on Sep. 12, 2019.

(51) Int. Cl.
*C03B 17/06*    (2006.01)
(52) U.S. Cl.
CPC .................. *C03B 17/068* (2013.01)
(58) Field of Classification Search
CPC ....... C03B 17/068; C03B 13/04; C03B 13/16; C03B 17/06
See application file for complete search history.

(56) References Cited

U.S. PATENT DOCUMENTS 1,569,465 A * 1/1926 Drake ..................... C03B 13/02
65/95
1,603,946 A * 10/1926 Gelstharp ............... C03B 13/04
65/186

(Continued)

FOREIGN PATENT DOCUMENTS

CN    204918361 U    12/2015
GB      0301083 A     5/1929

(Continued)

OTHER PUBLICATIONS

European Patent Application No. 20863006.1, Extended European Search Report, dated Aug. 10, 2023; 9 pages; European Patent Office.

(Continued)

*Primary Examiner* — Jodi C Franklin
(74) *Attorney, Agent, or Firm* — Matthew J. Mason

(57) ABSTRACT

A glass manufacturing apparatus includes a delivery apparatus defining a travel path extending in a travel direction. The delivery apparatus conveys a glass ribbon along the travel path in the travel direction of the delivery apparatus. The glass manufacturing apparatus includes a first forming roll and a second forming roll spaced apart from the first forming roll to define a gap. The first forming roll and the second forming roll receive the glass ribbon along the travel path within the gap. A drive apparatus is coupled to the first forming roll and the second forming roll. The drive apparatus moves one or more of the first forming roll independently of the second forming roll or the second forming roll independently of the first forming roll to change a width of the gap.

12 Claims, 9 Drawing Sheets

(56) References Cited

U.S. PATENT DOCUMENTS

| | | | |
|---|---|---|---|
| 1,616,405 A * | 2/1927 | Avery | C03B 13/04 65/194 |
| 1,772,072 A * | 8/1930 | Drake | C03B 13/04 65/254 |
| 1,829,409 A * | 10/1931 | Kingsley | C03B 13/12 65/185 |
| 3,227,537 A * | 1/1966 | Novack | C03B 13/04 65/327 |
| 5,662,950 A | 9/1997 | Kusago | |
| 6,045,251 A | 4/2000 | Mizunuma et al. | |
| 6,896,646 B2 * | 5/2005 | Kaiser | C03B 35/18 492/50 |
| 7,934,392 B2 | 5/2011 | Greulich-Hickmann et al. | |
| 8,713,972 B2 * | 5/2014 | Lakota | C03B 13/04 65/99.1 |
| 8,820,120 B2 | 9/2014 | Cook et al. | |
| 9,003,835 B2 * | 4/2015 | Lock | C03B 17/065 65/195 |
| 9,346,698 B2 * | 5/2016 | Poissy | C03B 13/16 |
| 9,556,055 B2 * | 1/2017 | Likitvanichkul | C03B 32/02 |
| 9,643,872 B2 | 5/2017 | Fredholm | |
| 10,246,365 B2 * | 4/2019 | Bisson | C03B 35/246 |
| 11,414,337 B2 * | 8/2022 | Anderson | C03B 13/14 |
| 11,629,087 B2 * | 4/2023 | Bressler | C03C 1/00 65/97 |
| 11,964,895 B2 * | 4/2024 | Bressler | C03B 25/12 |
| 2009/0314032 A1 | 12/2009 | Tomamoto et al. | |
| 2012/0304695 A1 * | 12/2012 | Lakota | C03B 13/04 65/97 |
| 2013/0133369 A1 * | 5/2013 | Lock | C03B 17/065 65/93 |
| 2014/0144181 A1 * | 5/2014 | Poissy | C03B 13/04 65/253 |
| 2015/0027169 A1 * | 1/2015 | Fredholm | C03B 13/04 65/370.1 |
| 2015/0099618 A1 * | 4/2015 | Bisson | C03B 17/061 65/25.2 |
| 2016/0168003 A1 | 6/2016 | Hasegawa et al. | |
| 2019/0010075 A1 * | 1/2019 | Nakamura | C03B 25/12 |
| 2019/0169059 A1 * | 6/2019 | Fredholm | C03B 13/16 |

FOREIGN PATENT DOCUMENTS

| | | |
|---|---|---|
| JP | 2014-125364 A | 7/2014 |
| WO | 2015/054329 A1 | 4/2015 |
| WO | 2019/089525 A1 | 5/2019 |

OTHER PUBLICATIONS

International Search Report and Written Opinion of the International Searching Authority; PCT/US2020/049307; Mailed Dec. 16, 2020; 14 Pages; Korean Intellectual Property Office.

* cited by examiner

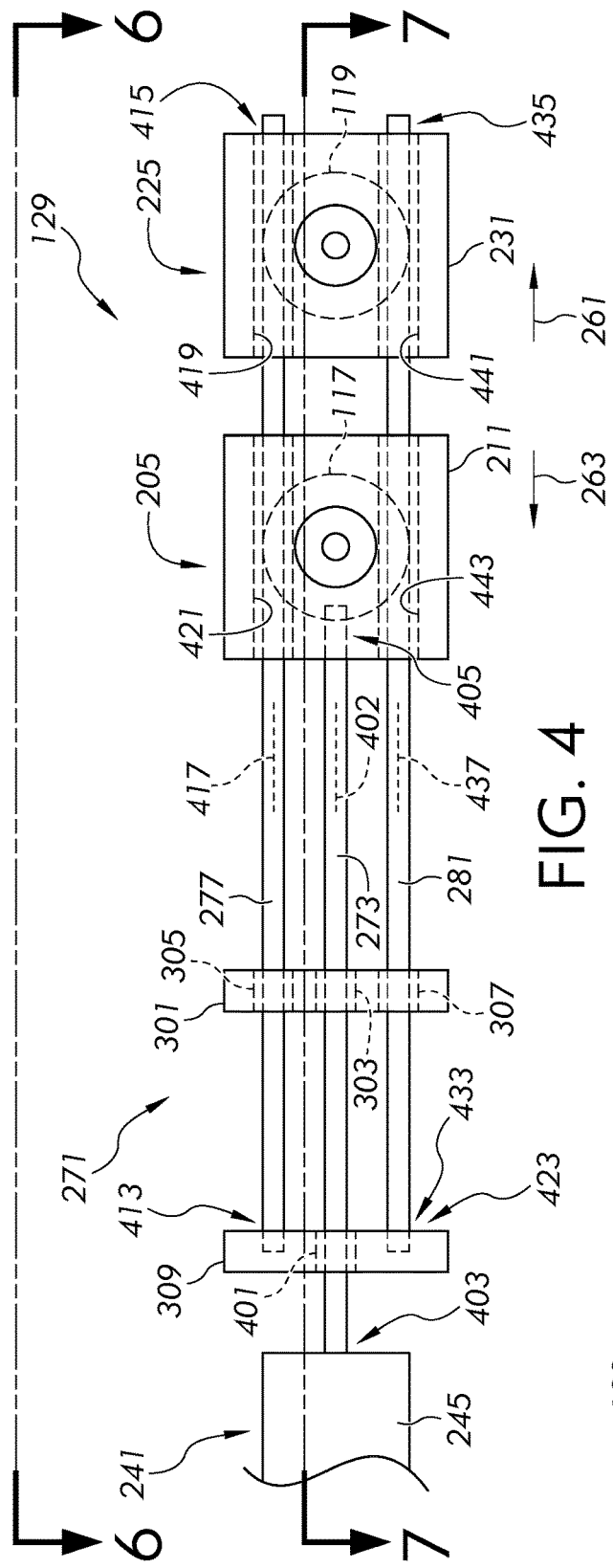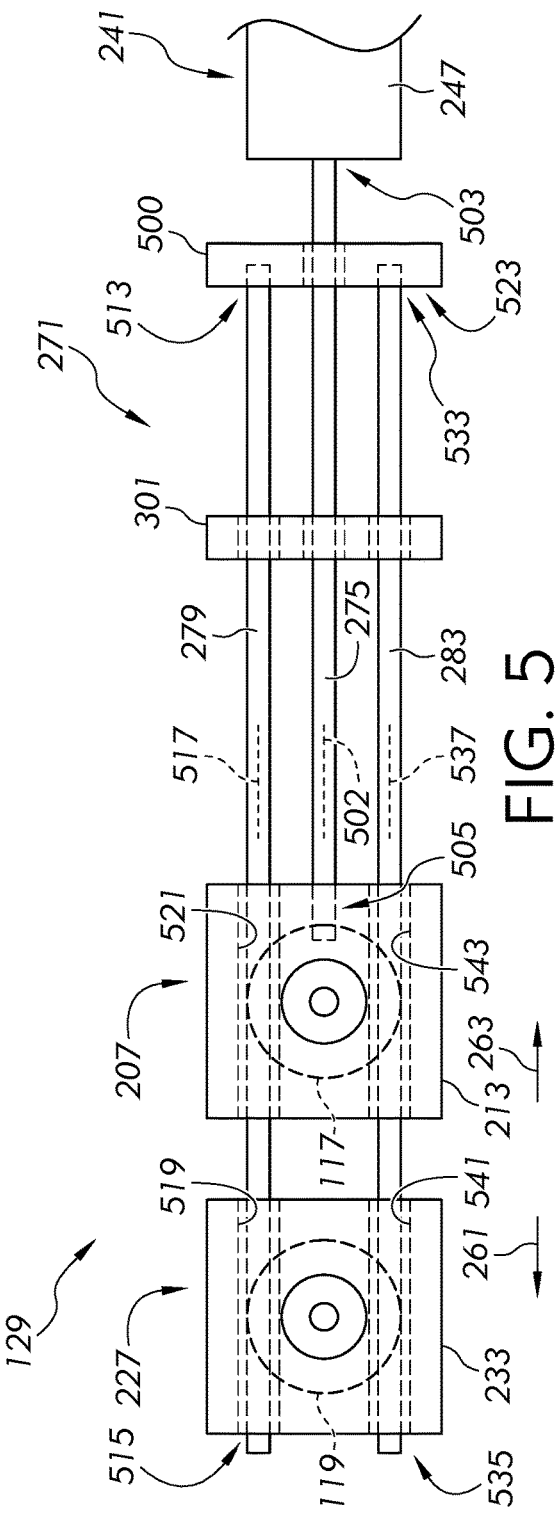

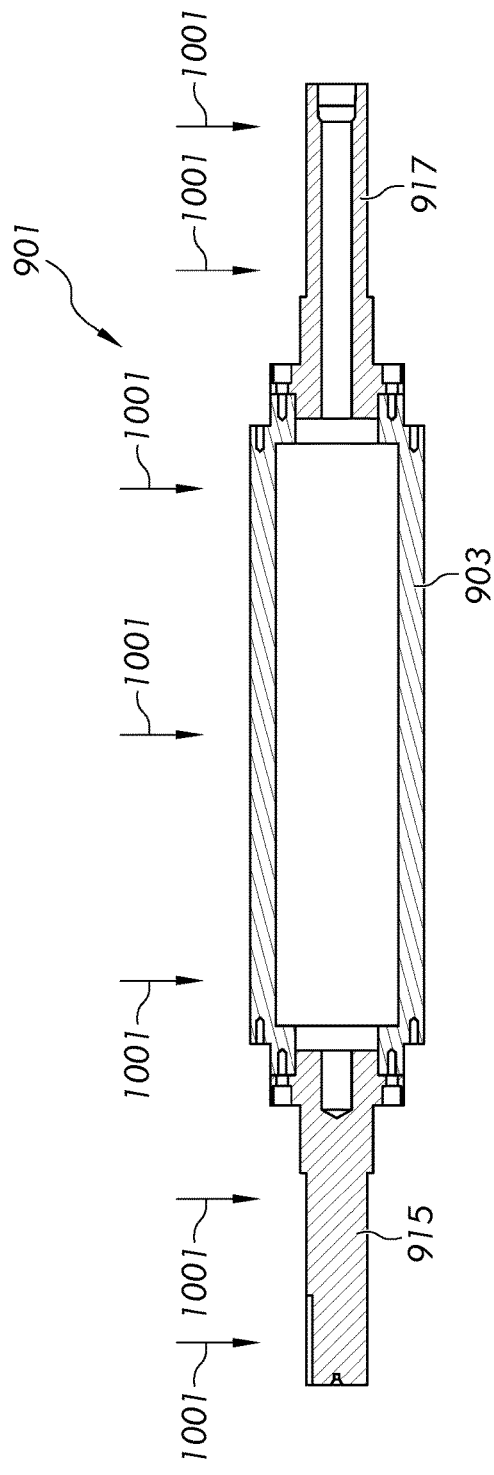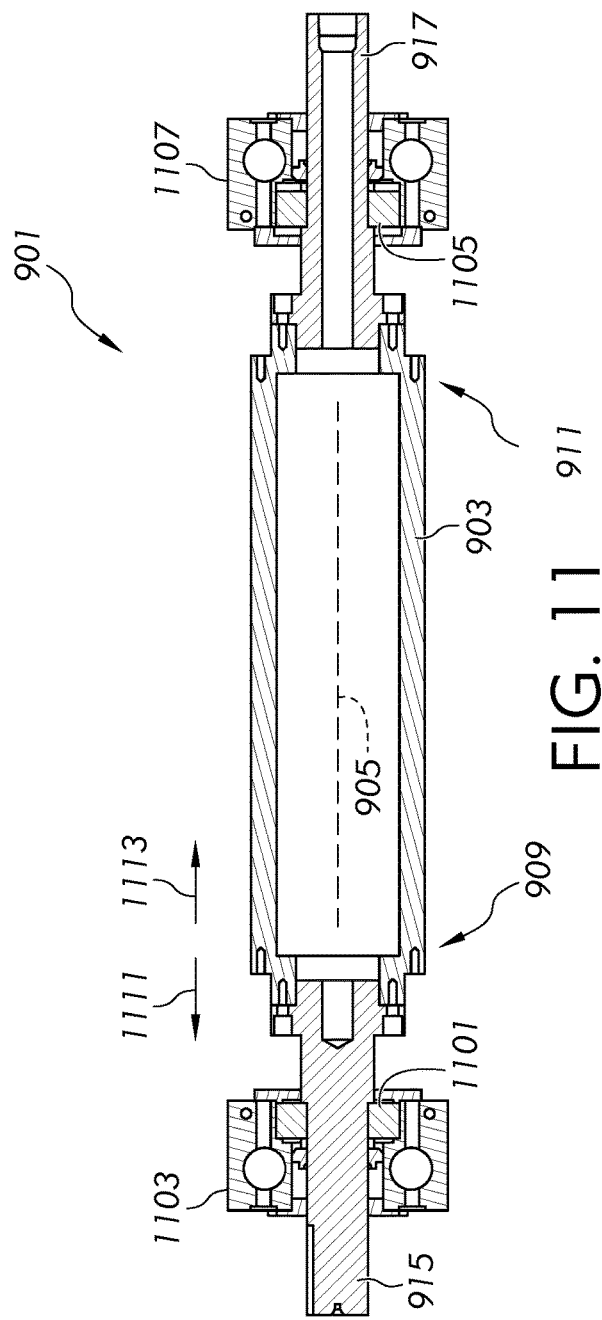

METHODS AND APPARATUS FOR MANUFACTURING A GLASS RIBBON

CROSS-REFERENCE TO RELATED APPLICATIONS

This application claims the benefit of priority under 35 U.S.C. § 371 of International Application No. PCT/US2020/049307, filed on Sep. 4, 2020, which claims the benefit of priority under 35 U.S.C. § 119 of U.S. Provisional Application Ser. No. 62/899,450, filed on Sep. 12, 2019, the contents of which are relied upon and incorporated herein by reference in its entirety.

FIELD

The present disclosure relates generally to methods for manufacturing a glass ribbon and, more particularly, to methods for manufacturing a glass ribbon with a glass manufacturing apparatus comprising a drive apparatus.

BACKGROUND

It is known to manufacture molten material into a glass ribbon with a glass manufacturing apparatus. A pair of forming rolls can be spaced apart to define a gap that can receive the molten material. The molten material can pass through the gap, whereupon the molten material can be flattened into a glass ribbon. Gap rings control a width of the gap, and, to adjust the width of the gap, the glass manufacturing apparatus is stopped and the distance separating the forming rolls is adjusted by changing the gap rings. However, temporarily stopping production is inefficient and costly. In addition, variations in the width of the gap may occur, for example, with one end of the forming rolls being closer together than an opposing end.

SUMMARY

The following presents a simplified summary of the disclosure to provide a basic understanding of some embodiments described in the detailed description.

There are set forth methods of manufacturing a glass ribbon, comprising introducing a glass ribbon along a travel path in a travel direction to a gap defined between a first forming roll and a second forming roll, and passing the glass ribbon through the gap. Methods comprise changing a width of the gap by moving one or more of the first forming roll independently of the second forming roll. By independently moving the first forming roll, the width of the gap can be changed along a length of the forming rolls, which can adjust for variations in gap width along a length of the forming rolls. In addition, a servo motor can control movement of the first forming roll and/or the second forming roll, in which the servo motor can provide incremental adjustment of the forming rolls and allow for the adjustment to occur without stopping production, thus increasing efficiency. To further reduce variations in the width of the gap, the first forming roll and the second forming roll can be machined after being assembled.

In some embodiments, a glass manufacturing apparatus comprises a delivery apparatus defining a travel path extending in a travel direction. The delivery apparatus is configured to convey a glass ribbon along the travel path in the travel direction of the delivery apparatus. The glass manufacturing apparatus comprises a first forming roll. The glass manufacturing apparatus comprises a second forming roll spaced apart from the first forming roll to define a gap. The first forming roll and the second forming roll are configured to receive the glass ribbon along the travel path within the gap. The glass manufacturing apparatus comprises a drive apparatus coupled to the first forming roll and the second forming roll. The drive apparatus is configured to move one or more of the first forming roll independently of the second forming roll or the second forming roll independently of the first forming roll to change a width of the gap.

In some embodiments, the drive apparatus comprises a first translational drive apparatus coupled to the first forming roll and a second translational drive apparatus coupled to the second forming roll. The first translational drive apparatus is configured to move one or more of a first end or a second end of the first forming roll along a movement axis that is substantially perpendicular to the travel path. The second translational drive apparatus is configured to move one or more of a first end or a second end of the second forming roll along the movement axis.

In some embodiments, the first forming roll comprises a first outer radial surface that extends about a first forming axis between the first end and the second end of the first forming roll. The first outer radial surface comprises a constant diameter along the first forming axis between the first end and the second end of the first forming roll.

In some embodiments, the second forming roll comprises a second outer radial surface that extends about a second forming axis between the first end and the second end of the second forming roll. The second outer radial surface comprises a constant diameter along the second forming axis between the first end and the second end of the second forming roll.

In some embodiments, the glass manufacturing apparatus further comprises a transfer apparatus comprising a frame. The transfer apparatus comprises a first support shaft comprising a first inner end and a first outer end, and a second support shaft comprising a second inner end and a second outer end. The first support shaft and the second support shaft are mounted in the frame. The first forming roll is mounted to the first outer end of the first support shaft and the second outer end of the second support shaft. The transfer apparatus comprises a third support shaft comprising a third inner end and a third outer end, and a fourth support shaft comprising a fourth inner end and a fourth outer end. The third support shaft and the fourth support shaft are mounted in the frame. The second forming roll is mounted to the third outer end of the third support shaft and the fourth outer end of the fourth support shaft.

In some embodiments, the first inner end and the second inner end are attached to the first translational drive apparatus, and the third inner end and the fourth inner end are attached to the second translational drive apparatus.

In some embodiments, the transfer apparatus comprises an attachment plate. The third inner end and the fourth inner end are attached to a first side of the attachment plate and the second translational drive apparatus is attached to a second side of the attachment plate. The second translational drive apparatus is configured to move the attachment plate, the third support shaft, and the fourth support shaft along the movement axis.

In some embodiments, the first support shaft and the second support shaft extend through the attachment plate and move along the movement axis independently of the movement of the attachment plate.

In some embodiments, the first translational drive apparatus comprises a servo motor.

In some embodiments, the second translational drive apparatus comprises one or more of a pneumatic cylinder or a servo motor.

In some embodiments, methods of manufacturing a glass ribbon comprise introducing the glass ribbon along a travel path in a travel direction to a gap defined between a first forming roll and a second forming roll. Methods comprise passing the glass ribbon through the gap. Methods comprise changing a width of the gap by moving one or more of the first forming roll independently of the second forming roll along a movement axis that is substantially perpendicular to the travel path or the second forming roll independently of the first forming roll along the movement axis.

In some embodiments, methods comprise assembling the first forming roll and the second forming roll, and, after the assembling, machining one or more surfaces of the first forming roll or the second forming roll to reduce a variation in the width of the gap.

In some embodiments, the changing the width of the gap comprises moving one end of the first forming roll to accommodate for a variation in the width of the gap along the length of the gap.

In some embodiments, the changing the width of the gap occurs as the glass ribbon is received within the gap.

In some embodiments, methods comprise monitoring a characteristic of the glass ribbon and, based on the characteristic, changing the width of the gap.

In some embodiments, the characteristic comprises one or more of a force exerted on one or more of the first forming roll or the second forming roll, or a thickness of the glass ribbon.

In some embodiments, methods of manufacturing a glass ribbon comprise assembling a first forming roll and a second forming roll. Methods comprise machining one or more surfaces of the first forming roll or the second forming roll to reduce a variation in a width of a gap defined between the first forming roll and the second forming roll. Methods comprise introducing the glass ribbon along a travel path in a travel direction to the gap. Methods comprise passing the glass ribbon through the gap.

In some embodiments, the assembling comprises attaching a first shaft to a first side of a first roller and a second shaft to a second side of the first roller to form the first forming roll, and attaching a third shaft to a first side of a second roller and a fourth shaft to a second side of the second roller to form the second forming roll.

In some embodiments, the assembling comprises attaching the first shaft to a first bearing and the second shaft to a second bearing and attaching the third shaft to a third bearing and the fourth shaft to a fourth bearing.

In some embodiments, the machining occurs after the assembling of the first forming roll and the second forming roll.

Additional features and advantages of the embodiments disclosed herein will be set forth in the detailed description that follows, and in part will be clear to those skilled in the art from that description or recognized by practicing the embodiments described herein, including the detailed description which follows, the claims, as well as the appended drawings. It is to be understood that both the foregoing general description and the following detailed description present embodiments intended to provide an overview or framework for understanding the nature and character of the embodiments disclosed herein. The accompanying drawings are included to provide further understanding and are incorporated into and constitute a part of this specification. The drawings illustrate various embodiments of the disclosure, and together with the description explain the principles and operations thereof.

BRIEF DESCRIPTION OF THE DRAWINGS

These and other features, embodiments and advantages are better understood when the following detailed description is read with reference to the accompanying drawings, in which:

FIG. 4 illustrates a side view of example embodiments of a drive apparatus along line 4-4 of FIG. 3 in accordance with embodiments of the disclosure;

FIG. 5 illustrates a side view of example embodiments of a drive apparatus along line 5-5 of FIG. 2 in accordance with embodiments of the disclosure;

FIG. 10 illustrates a perspective view of example embodiments of a forming roll comprising a roller attached to a first shaft and a second shaft in accordance with embodiments of the disclosure; and FIG. 11 illustrates a perspective view of example embodiments of a forming roll comprising a first shaft attached to a first bearing block and a second shaft attached to a second bearing block in accordance with embodiments of the disclosure.

DETAILED DESCRIPTION

Figure 1:
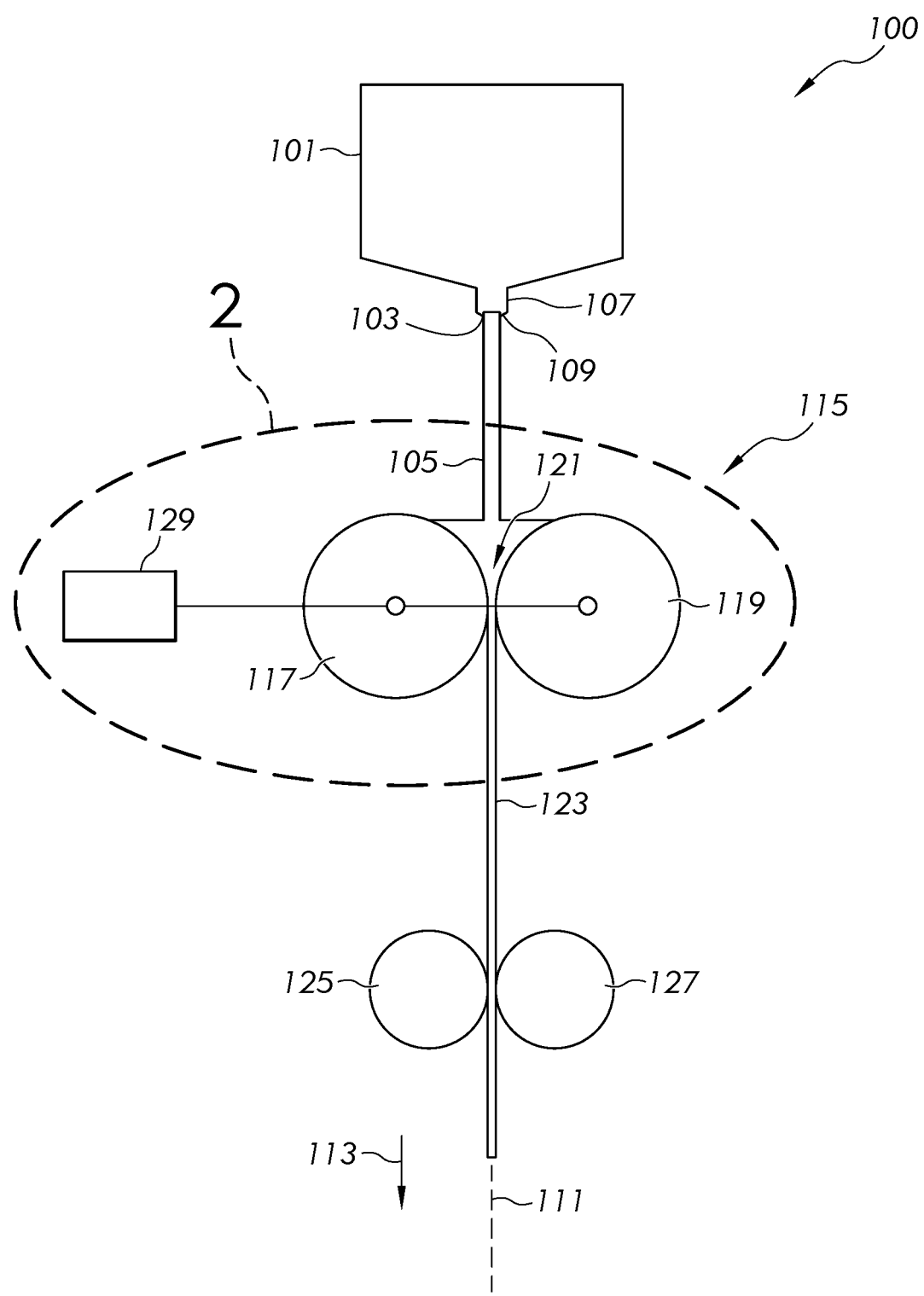
FIG. 1 schematically illustrates example embodiments of a glass manufacturing apparatus in accordance with embodiments of the disclosure.

Embodiments will now be described more fully hereinafter with reference to the accompanying drawings in which example embodiments are shown. Whenever possible, the same reference numerals are used throughout the drawings to refer to the same or like parts. However, this disclosure may be embodied in many different forms and should not be construed as limited to the embodiments set forth herein.

The present disclosure relates to a glass manufacturing apparatus and methods for forming a glass ribbon. For purposes of this application, "glass ribbon" may be considered one or more of a glass ribbon in a viscous state, a glass ribbon in an elastic state (e.g., at room temperature) and/or a glass ribbon in a viscoelastic state between the viscous state and the elastic state. Methods and apparatus for forming a glass ribbon will now be described by way of example embodiments. As schematically illustrated in FIG. 1, in some embodiments, an exemplary glass manufacturing apparatus 100 can comprise a delivery apparatus 101 with a delivery slot 103 to slot draw a stream of glass material, for example, a glass ribbon 105. In some embodiments, the delivery apparatus 101 can comprise a delivery tube 107 terminating at a lower end 109 in the delivery slot 103. For example, the delivery tube 107 may comprise a passageway through which the glass-forming material 105 can exit the delivery apparatus 101. The delivery slot 103 may comprise an opening, a hole etc. through which the glass ribbon 105 can exit the delivery tube 107. In some embodiments, the delivery tube 107 can be oriented along a direction of gravity, such that the glass ribbon 105 can flow downwardly along the direction of gravity through the delivery tube 107.

In some embodiments, the delivery apparatus 101 can define a travel path 111 extending in a travel direction 113 to a forming apparatus 115. The delivery apparatus 101 can convey the glass ribbon 105 along the travel path 111 in the travel direction 113 of the delivery apparatus 101. The forming apparatus 115 can comprise a pair of opposing forming rolls, for example, a first forming roll 117 and a second forming roll 119. In some embodiments, the second forming roll 119 may be spaced apart from the first forming roll 117 to define a gap 121. In some embodiments, the first forming roll 117 and the second forming roll 119 can rotate counter to one another. For example, in the orientation shown in FIG. 1, the first forming roll 117 can rotate in a clockwise direction while the second forming roll 119 can rotate in a counterclockwise direction. In some embodiments, the first forming roll 117 and the second forming roll 119 can receive the glass ribbon 105 along the travel path 111 within the gap 121. The glass ribbon 105 can accumulate between the first forming roll 117 and the second forming roll 119, whereupon the first forming roll 117 and the second forming roll 119 can flatten, thin, and smooth the glass ribbon 105 into a glass ribbon 123.

In some embodiments, the glass ribbon 123 can exit the first forming roll 117 and the second forming roll 119 and may be delivered to a pair of pulling rolls 125, 127. The pulling rolls 125, 127 can pull downwardly on the glass ribbon 123 and, in some embodiments, can generate a tension in the glass ribbon 123 to stabilize and/or stretch the glass ribbon 123. In some embodiments, the pulling rolls 125, 127 can rotate counter to one another. For example, in the orientation shown in FIG. 1, one pulling roll 125 can rotate in a clockwise direction while the other pulling roll 127 can rotate in a counterclockwise direction. In some embodiments, the glass ribbon 123 can move along the travel path 111 in the travel direction 113. In some embodiments, the glass ribbon 123 can comprise one or more states of material based on the vertical location of the glass ribbon 123. For example, at one location (e.g., directly below the forming rolls 117, 119), the glass ribbon 123 can comprise a viscous material, while at another location (e.g., directly above the pulling rolls 125, 127), the glass ribbon 123 can comprise an amorphous solid in a glassy state. In some embodiments, a drive apparatus 129 can be coupled to the first forming roll 117 and the second forming roll 119. As described relative to FIGS. 2-11, the drive apparatus 129 can move one or more of the first forming roll 117 or the second forming roll 119 to adjust a dimension of the gap 121.

In some embodiments, methods of manufacturing a glass ribbon can comprise introducing the glass ribbon, for example, a viscous glass material, 105 along the travel path 111 in the travel direction 113 to the gap 121 defined between the first forming roll 117 and the second forming roll 119. For example, the glass ribbon 105 can exit the delivery apparatus 101 and travel along the travel path 111.

The glass ribbon 105 can travel in the travel direction 113, which, in some embodiments, may be downwardly along a direction of gravity. In some embodiments, methods of manufacturing a glass ribbon can comprise passing the glass ribbon 105 through the gap 121 to form the glass ribbon 123. For example, as the glass ribbon 105 passes through the gap 121, the first forming roll 117 and the second forming roll 119 can flatten, thin, and smooth the glass ribbon 105 into a flattened glass ribbon 123.

Figure 2:
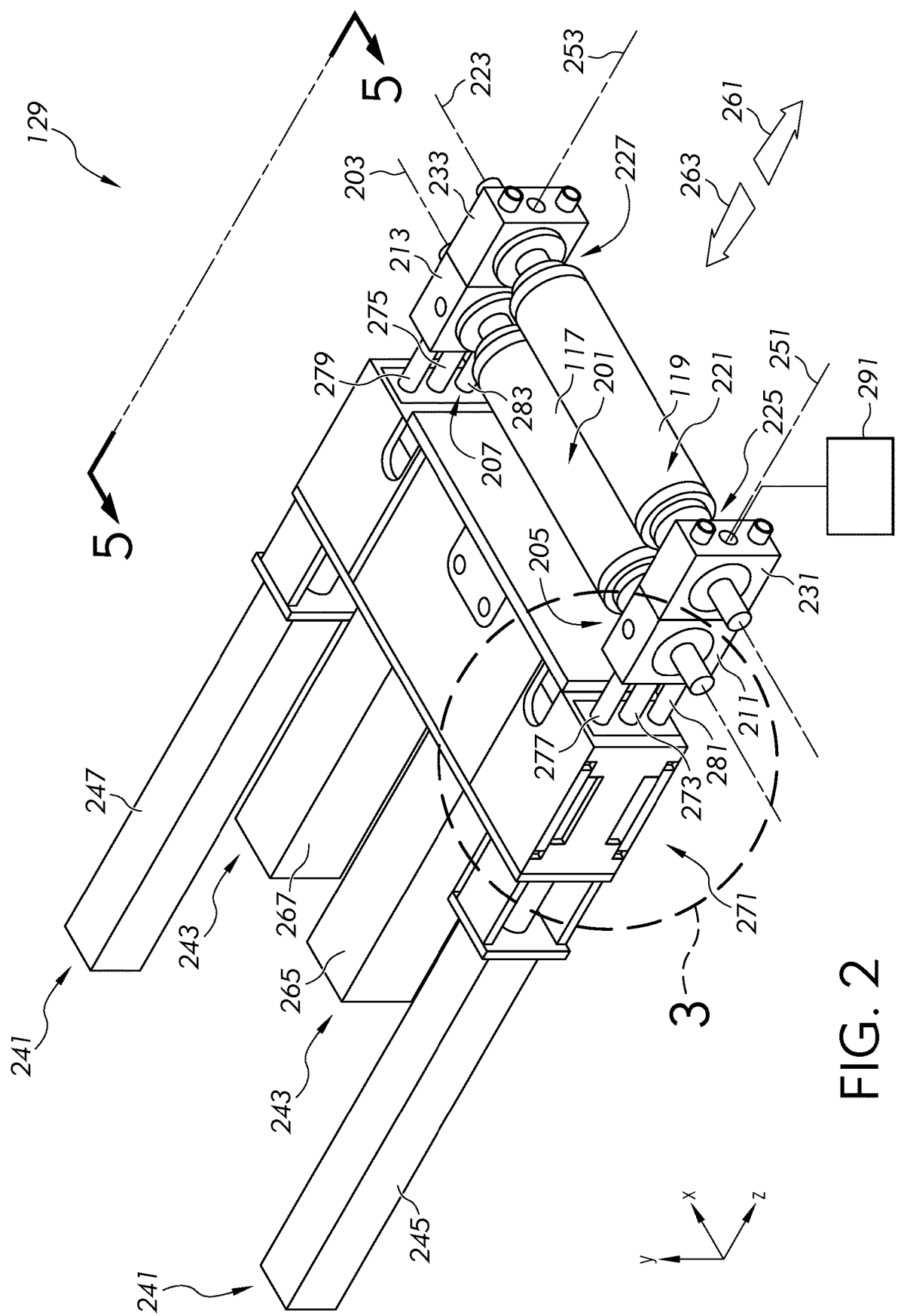
FIG. 2 illustrates an enlarged view of a drive apparatus taken at view 2 of FIG. 1 in accordance with embodiments of the disclosure.

FIG. 2 illustrates the forming apparatus 115 comprising the drive apparatus 129 coupled to the first forming roll 117 and the second forming roll 119 taken at view 2 of FIG. 1. While the drive apparatus 129 is illustrated as being coupled to first forming roll 117 and the second forming roll 119 in FIG. 1, the drive apparatus 129 is not so limited. For example, in some embodiments, in addition or in the alternative, the drive apparatus 129 can be coupled to the pulling rolls 125, 127. The drive apparatus 129 can control the pulling rolls 125, 127 in a substantially identical manner as described herein relative to the drive apparatus 129 controlling the first forming roll 117 and the second forming roll 119. In some embodiments, the first forming roll 117 can comprise a first outer radial surface 201 that extends about a first forming axis 203 between a first end 205 and a second end 207 of the first forming roll 117. In some embodiments, the first outer radial surface 201 can comprise a constant diameter along the first forming axis 203 between the first end 205 and the second end 207. In some embodiments, the first forming roll 117 can be attached to one or more bearing blocks, for example, a first bearing block 211 and a second bearing block 213. The first end 205 of the first forming roll 117 can be attached to the first bearing block 211 and the second end 207 of the first forming roll 117 can be attached to the second bearing block 213. In some embodiments, the first bearing block 211 and the second bearing block 213 can comprise one or more structures that can facilitate rotation of the first forming roll 117. For example, the first bearing block 211 and the second bearing block 213 can comprise bearings, for example, spherical bearings, that can allow for rotation of the first forming roll 117 about the first forming axis 203 relative to the first bearing block 211 and the second bearing block 213. While allowing for rotation of the first forming roll 117, the first bearing block 211 and the second bearing block 213 can limit inadvertent movement of the first forming roll 117 in or more of the x-direction, y-direction, z-direction, or combinations thereof.

The second forming roll 119 can be substantially identical to the first forming roll 117. For example, in some embodiments, the second forming roll 119 can comprise a second outer radial surface 221 that extends about a second forming axis 223 between a first end 225 and a second end 227 of the second forming roll 119. In some embodiments, the second outer radial surface 221 can comprise a constant diameter along the second forming axis 223 between the first end 225 and the second end 227. In some embodiments, the first outer radial surface 201 and the second outer radial surface 221 are not limited to comprising a constant diameter. Rather, in some embodiments, one or more of the first outer radial surface 201 or the second outer radial surface 221 may comprise a non-constant diameter, for example, with the diameter varying along an axis along which the first outer radial surface 201 and/or the second outer radial surface 221 extends. The second forming axis 223 can be substantially parallel to the first forming axis 203. In some embodiments, the second forming roll 119 can be attached to one or more bearing blocks, for example, a third bearing block 231 and a fourth bearing block 233. The first end 225 of the second forming roll 119 can be attached to the third bearing block 231 and the second end 227 of the second forming roll 119 can be attached to the fourth bearing block 233. In some embodiments, one or more of the first bearing block 211, the second bearing block 213, the third bearing block 231, or the fourth bearing block 233 may be substantially identical. For example, the third bearing block 231 and the fourth bearing block 233 can comprise one or more structures that can facilitate rotation of the second forming roll 119. For example, the third bearing block 231 and the fourth bearing block 233 can comprise bearings, for example, spherical bearings, that can allow for rotation of the second forming roll 119 about the second forming axis 223 relative to the third bearing block 231 and the fourth bearing block 233. While allowing for rotation of the second forming roll 119, the third bearing block 231 and the fourth bearing block 233 can limit inadvertent movement of the second forming roll 119 in or more of the x-direction, y-direction, z-direction, or combinations thereof. In some embodiments, the first bearing block 211 and the third bearing block 231 may be located on one side of the forming rolls 117, 119 (e.g., at the first end 205 of the first forming roll 117 and at the first end 225 of the second forming roll 119), while the second bearing block 213 and the fourth bearing block 233 may be located on an opposing side of the forming rolls 117, 119 (e.g., at the second end 207 of the first forming roll 117 and at the second end 227 of the second forming roll 119).

In some embodiments, the drive apparatus 129 can comprise one or more translational drive apparatuses, for example, a first translational drive apparatus 241 coupled to the first forming roll 117 and a second translational drive apparatus 243 coupled to the second forming roll 119. In some embodiments, the first translational drive apparatus 241 can be coupled to the first bearing block 211 and the second bearing block 213, such that the first translational drive apparatus 241 can control movement of the first end 205 and the second end 207 of the first forming roll 117. While FIG. 2 illustrates the first translational drive apparatus 241 comprising two translational drive apparatuses in some embodiments, the first translational drive apparatus 241 can comprise one or more translational drive apparatuses. For example, as illustrated in FIG. 2, the first translational drive apparatus 241 can comprise a first end translational drive apparatus 245 and a second end translational drive apparatus 247. The first end translational drive apparatus 245 can be coupled to the first bearing block 211 and can move the first bearing block 211 along a movement axis, for example, a first movement axis 251. The second end translational drive apparatus 247 can be coupled to the second bearing block 213 and can move the second bearing block 213 along a movement axis, for example, a second movement axis 253. In some embodiments, the first movement axis 251 and the second movement axis 253 may be substantially parallel. In some embodiments, the first end translational drive apparatus 245 can move the first bearing block 211 along the first movement axis 251 in a first direction 261, which is towards the second forming roll 119, and/or in a second direction 263, which is away from the second forming roll 119. In some embodiments, the second end translational drive apparatus 247 can move the second bearing block 213 along the second movement axis 253 in the first direction 261, which is towards the second forming roll 119, and/or in the second direction 263, which is away from the second forming roll 119.

In some embodiments, the first translational drive apparatus 241 (e.g., comprising the first end translational drive apparatus 245 and the second end translational drive apparatus 247) can independently control the movement of the first end 205 and the second end 207 of the first forming roll 117. For example, in some embodiments, the first end translational drive apparatus 245 can move the first end 205 in the first direction 261 while the second end translational drive apparatus 247 moves the second end 207 in the second direction 263. In some embodiments, the first end translational drive apparatus 245 can move the first end 205 in the second direction 263 while the second end translational drive apparatus 247 moves the second end 207 in the first direction 261. In some embodiments, the first end translational drive apparatus 245 can move the first end 205 a first distance in the first direction 261 and the second end translational drive apparatus 247 can move the second end 207 a second distance (e.g., which may be the same as or different than the first distance) in the first direction 261. In some embodiments, the first end translational drive apparatus 245 can move the first end 205 a first distance in the second direction 263 and the second end translational drive apparatus 247 can move the second end 207 a second distance (e.g., which may be the same as or different than the first distance) in the second direction 263.

The first translational drive apparatus 241 is not limited to comprising the first end translational drive apparatus 245 and the second end translational drive apparatus 247, but, rather, in some embodiments, the first translational drive apparatus 241 can comprise a single translational drive apparatus. For example, when the first translational drive apparatus 241 comprises a single translational drive apparatus, the first translational drive apparatus 241 can be coupled to the first bearing block 211 and the second bearing block 213, and can move the first bearing block 211 and the second bearing block 213 along the first movement axis 251 and the second movement axis 253, respectively, in the first direction 261 or the second direction 263. In contrast to when the first translational drive apparatus 241 comprises two translational drive apparatuses (e.g., as illustrated in FIG. 2), when the first translational drive apparatus 241 comprises a single first translational drive apparatus, the first end 205 and the second end 207 of the first forming roll 117 are limited to moving together in the same direction (e.g., the first end 205 and the second end 207 moving together in the first direction 261, or the first end 205 and the second end 207 moving together in the second direction 263).

In some embodiments, the first translational drive apparatus 241 can comprise a servo motor. For example, in some embodiments, when the first translational drive apparatus 241 comprises the first end translational drive apparatus 245 and the second end translational drive apparatus 247, the first end translational drive apparatus 245 can comprise a servo motor, and the second end translational drive apparatus 247 can comprise a servo motor. The servo motors can provide incremental control of the movement of the first bearing block 211 and the second bearing block 213. For example, the servo motors can allow for movement of the first bearing block 211 and/or the second bearing block 213 a desired distance while the glass manufacturing apparatus 100 is in operation and the glass ribbon 105 is being delivered to the first forming roll 117 and the second forming roll 119. The first translational drive apparatus 241 comprising one or more servo motors can therefore provide more accurate control of a position of the first forming roll 117 relative to the second forming roll 119, and a more accurate gap width between the first forming roll 117 and the second forming roll 119. In addition, the first translational drive apparatus 241 comprising one or more servo motors can facilitate an adjustment of the gap width between the first forming roll 117 and the second forming roll 119 while the glass manufacturing apparatus 100 is in operation, thus reducing downtime and increasing efficiency.

Referring to the second translational drive apparatus 243, in some embodiments, the second translational drive apparatus 243 can be coupled to the third bearing block 231 and the fourth bearing block 233, such that the second translational drive apparatus 243 can control movement of the first end 225 and the second end 227 of the second forming roll 119. While FIG. 2 illustrates the second translational drive apparatus 243 comprising two translational drive apparatuses 243, in some embodiments, the second translational drive apparatus 243 can comprise one or more translational drive apparatuses. For example, as illustrated in FIG. 2, the second translational drive apparatus 243 can comprise a third end translational drive apparatus 265 and a fourth end translational drive apparatus 267. The third end translational drive apparatus 265 can be coupled to the third bearing block 231 and can move the third bearing block 231 along a movement axis, for example, the first movement axis 251. The fourth end translational drive apparatus 267 can be coupled to the fourth bearing block 233 and can move the fourth bearing block 233 along a movement axis, for example, the second movement axis 253. In some embodiments, the third end translational drive apparatus 265 can move the third bearing block 231 along the first movement axis 251 in the first direction 261 and/or in the second direction 263. In some embodiments, the fourth end translational drive apparatus 267 can move the fourth bearing block 233 along the second movement axis 253 in the first direction 261 and/or in the second direction 263.

In some embodiments, the second translational drive apparatus 243 (e.g., comprising the third end translational drive apparatus 265 and the fourth end translational drive apparatus 267) can independently control the movement of the first end 225 and the second end 227 of the second forming roll 119. For example, in some embodiments, the third end translational drive apparatus 265 can move the first end 225 in the first direction 261 while the fourth end translational drive apparatus 267 moves the second end 227 in the second direction 263. In some embodiments, the third end translational drive apparatus 265 can move the first end 225 in the second direction 263 while the fourth end translational drive apparatus 267 moves the second end 227 in the first direction 261. In some embodiments, the third end translational drive apparatus 265 can move the first end 225 a first distance in the first direction 261 and the fourth end translational drive apparatus 267 can move the second end 227 a second distance (e.g., which may be the same as or different than the first distance) in the first direction 261. In some embodiments, the third end translational drive apparatus 265 can move the first end 225 a first distance in the second direction 263 and the fourth end translational drive apparatus 267 can move the second end 227 a second distance (e.g., which may be the same as or different than the first distance) in the second direction 263.

The second translational drive apparatus 243 may not be limited to comprising the third end translational drive apparatus 265 and the fourth end translational drive apparatus 267, but, rather, in some embodiments, the second translational drive apparatus 243 can comprise a single translational drive apparatus. For example, when the second translational drive apparatus 243 comprises a single translational drive apparatus, the second translational drive apparatus 243 can be coupled to the first bearing block 211 and the second bearing block 213, and can move the first bearing block 211 and the second bearing block 213 along the first movement axis 251 and the second movement axis 253, respectively, in the first direction 261 or the second direction 263. In contrast to when the second translational drive apparatus 243 comprises two translational drive apparatuses (e.g., as illustrated in FIG. 2), when the second translational drive apparatus 243 comprises a single first translational drive apparatus, the first end 225 and the second end 227 of the first forming roll 117 are limited to moving together in the same direction (e.g., the first end 225 and the second end 227 moving together in the first direction 261, or the first end 225 and the second end 227 moving together in the second direction 263).

In some embodiments, the second translational drive apparatus 243 can comprise one or more of a pneumatic cylinder or a servo motor. For example, in some embodiments, when the second translational drive apparatus 243 comprises the third end translational drive apparatus 265 and the fourth end translational drive apparatus 267, the third end translational drive apparatus 265 can comprise one or more of a pneumatic cylinder or a servo motor, and the fourth end translational drive apparatus 267 can comprise one or more of a pneumatic cylinder or a servo motor. While the pneumatic cylinder may provide less incremental control of the movement of the third bearing block 231 and the fourth bearing block 233, the first translational drive apparatus 241 can comprise a servo motor which can offset any imprecision in the position of the third bearing block 231 and the fourth bearing block 233. For example, in some embodiments, the pneumatic cylinder can adjust the second forming roll 119 between two positions (e.g., a first, or opened, position, and a second, or closed, position). The first, or opened, position may be spaced farther apart from the first forming roll 117 than the second, or closed, position. In operation, the second translational drive apparatus 243 comprising the one or more pneumatic cylinders can maintain the second forming roll 119 in the second, or closed, position. To adjust a width of the gap between the first forming roll 117 and the second forming roll 119, the servo motors of the first translational drive apparatus 241 can incrementally move the first forming roll 117 relative to the second forming roll 119 while a position of the second forming roll 119 is maintained. In some embodiments, the pneumatic cylinder has at least some degree of flexibility or "give" in response to an increased force applied to the second forming roll 119. For example, in some embodiments, a solidified piece of material within the glass ribbon 105 may inadvertently be between the first forming roll 117 and the second forming roll 119, wherein the solidified piece has a size that is larger than a gap width between the first forming roll 117 and the second forming roll 119. The solidified piece may apply a force upon the first forming roll 117 and the second forming roll 119. The pneumatic cylinders can allow the second forming roll 119 to move in the first direction 261 and allow for the solidified piece to pass through the gap, thus reducing damage to the first forming roll 117 and the second forming roll 119.

In some embodiments, the second translational drive apparatus 243 may not be limited to comprising a pneumatic cylinder, and, instead, can comprise a servo motor. For example, in some embodiments, when the second translational drive apparatus 243 comprises the third end translational drive apparatus 265 and the fourth end translational drive apparatus 267, the third end translational drive apparatus 265 can comprise a servo motor, and the fourth end translational drive apparatus 267 can comprise a servo motor. The servo motors can provide incremental control of the movement of the third bearing block 231 and the fourth bearing block 233. For example, the servo motors can allow for movement of the third bearing block 231 and/or the fourth bearing block 233 a desired distance while the glass manufacturing apparatus 100 is in operation and the glass ribbon 105 is being delivered to the first forming roll 117 and the second forming roll 119. The second translational drive apparatus 243 comprising one or more servo motors can therefore provide more accurate control of a position of the second forming roll 119 relative to the first forming roll 117, and a more accurate gap width between the first forming roll 117 and the second forming roll 119. In addition, the second translational drive apparatus 243 comprising one or more servo motors can facilitate an adjustment of the gap width between the first forming roll 117 and the second forming roll 119 while the glass manufacturing apparatus 100 is in operation, thus reducing downtime and increasing efficiency.

Figure 3:
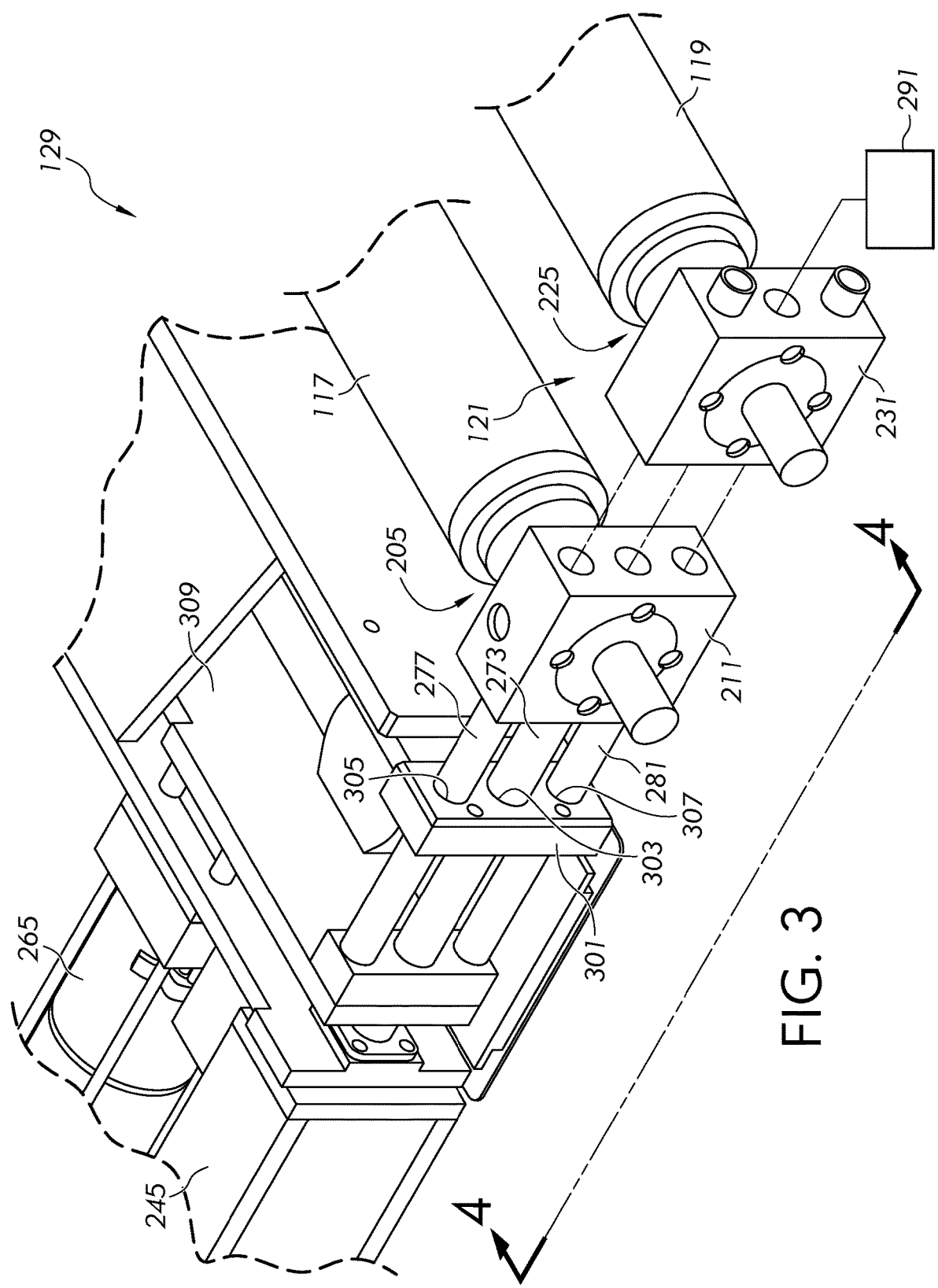
FIG. 3 illustrates an enlarged view of an end of a drive apparatus taken at view 3 of FIG. 2 in accordance with embodiments of the disclosure.

Referring to FIGS. 2-3, in some embodiments, the drive apparatus 129 can comprise a transfer apparatus 271 that can be coupled to the first forming roll 117 and the second forming roll 119. For example, in some embodiments, the transfer apparatus 271 can be coupled to the first translational drive apparatus 241 and the second translational drive apparatus 243 on one side, and to the first forming roll 117 and the second forming roll 119 on an opposite side. The transfer apparatus 271 can transfer output motion from the first translational drive apparatus 241 and the second translational drive apparatus 243 to the first forming roll 117 and the second forming roll 119, respectively, to cause movement of the first forming roll 117 and the second forming roll 119. The transfer apparatus 271 can comprise one or more support shafts, for example, a first support shaft 273, a second support shaft 275, a third support shaft 277, a fourth support shaft 279, a fifth support shaft 281, and a sixth support shaft 283. The first support shaft 273, the third support shaft 277, and the fifth support shaft 281 may be located on a first side of the first forming roll 117 and the second forming roll 119 (e.g., adjacent to the first end 205 and the first end 225). The second support shaft 275, the fourth support shaft 279, and the sixth support shaft 283 may be located on a second side of the of the first forming roll 117 and the second forming roll 119 (e.g., adjacent to the second end 207 and the second end 227).

In some embodiments, methods of manufacturing a glass ribbon can comprise monitoring a characteristic of the ribbon of glass ribbon 123 (e.g., illustrated in FIG. 1) and, based on the characteristic, changing the width of the gap 121. For example, in some embodiments, the characteristic can comprise one or more of a force exerted on one or more of the first forming roll 117 or the second forming roll 119, or a thickness of the glass ribbon 123. In some embodiments, during operation, the glass ribbon 105 can exert a force upon the first forming roll 117 and the second forming roll 119. This force can be monitored, for example, with a force monitor 291 (e.g., illustrated in FIGS. 2-3). The force monitor 291 can be coupled, for example, to the third bearing block 231, though, in some embodiments, the force monitor 291 can be coupled to one or more of the other bearing blocks, for example, the first bearing block 211, the second bearing block 213 (e.g., illustrated in FIG. 2), or the fourth bearing block 233 (e.g., illustrated in FIG. 2). The force monitor 291 can monitor the force that is exerted upon the second forming roll 119 by the glass ribbon 105. In some embodiments, based on the force that is detected by the force monitor 291, the width of the gap 121 can be changed. For example, in some embodiments, when the force detected by the force monitor 291 is larger than a predetermined force range, then the width of the gap 121 can be increased by moving the first forming roll 117 and the second forming roll 119 apart. In some embodiments, when the force detected by the force monitor 291 is smaller than a predetermined force range, then the width of the gap 121 can be decreased by moving the first forming roll 117 and the second forming roll 119 closer together.

In some embodiments, the characteristic of the glass ribbon 123 is not limited to the force exerted on one or more of the first forming roll 117 or the second forming roll 119. Rather, in some embodiments, the characteristic can comprise a thickness of the glass ribbon 123. The thickness of the glass ribbon 123 can be monitored, for example, with a visual inspection device, by an operator, etc. During the monitoring, when a thickness of the glass ribbon 123 is larger than a predetermined thickness range, then the width of the gap 121 can be decreased by moving the first forming roll 117 and the second forming roll 119 closer together, which can cause a reduction in the thickness of the glass ribbon 123. In some embodiments, when the thickness of the glass ribbon 123 is smaller than a predetermined thickness range, then the width of the gap 121 can be increased by moving the first forming roll 117 and the second forming roll 119 apart, which can cause an increase in the thickness of the glass ribbon.

FIG. 3 illustrates a portion of the transfer apparatus 271 taken at view 3 of FIG. 2. In some embodiments, the transfer apparatus 271 can comprise a frame 301. The frame 301 can be positioned between the first forming roll 117 and the drive apparatuses (e.g., the first end translational drive apparatus 245 and the third end translational drive apparatus 265). In some embodiments, the frame 301 can comprise a wall defining one or more openings, for example, a first opening 303, a second opening 305, and a third opening 307. In some embodiments, the openings of the frame 301 can receive the support shafts. For example, the first opening 303 can receive the first support shaft 273, the second opening 305 can receive the third support shaft 277, and the third opening 307 can receive the fifth support shaft 281. In some embodiments, the first opening 303, the second opening 305, and the third opening 307 may be larger in cross-sectional size than the first support shaft 273, the third support shaft 277, and the fifth support shaft 281. For example, the first opening 303 may comprise a cross-sectional size (e.g., diameter in FIG. 3) that may be larger than a cross-sectional size (e.g., diameter in FIG. 3) of the first support shaft 273. The second opening 305 may comprise a cross-sectional size (e.g., diameter in FIG. 3) that may be larger than a cross-sectional size (e.g., diameter in FIG. 3) of the third support shaft 277. The third opening 307 may comprise a cross-sectional size (e.g., diameter in FIG. 3) that may be larger than a cross-sectional size (e.g., diameter in FIG. 3) of the fifth support shaft 281. In some embodiments, due to the first opening 303 being larger than the first support shaft 273, the first support shaft 273 can be mounted in the frame 301, for example, by being horizontally and slidingly mounted. In some embodiments, due to the second opening 305 being larger than the third support shaft 277, the third support shaft 277 can be mounted in the frame 301, for example, by being horizontally and slidingly mounted. In some embodiments, due to the third opening 307 being larger than the fifth support shaft 281, the fifth support shaft 281 can be mounted in the frame 301, for example, by being horizontally and slidingly mounted. By being horizontally and slidingly mounted, the first support shaft 273 can move within the first opening 303 relative to the frame 301 along an axis along which the first support shaft 273 extends, the third support shaft 277 can move within the second opening 305 relative to the frame 301 along an axis along which the third support shaft 277 extends, and/or the fifth support shaft 281 can move within the third opening 307 relative to the frame 301 along an axis along which the fifth support shaft 281 extends.

In some embodiments, the transfer apparatus 271 can comprise an attachment plate, for example, a first attachment plate 309 (e.g., and a second attachment plate 500 illustrated in FIGS. 5-8). The first attachment plate 309 can be positioned between the frame 301 and the drive apparatuses (e.g., the first end translational drive apparatus 245 and the third end translational drive apparatus 265). In some embodiments, the first attachment plate 309 can comprise a wall that extends substantially parallel to the frame 301. The first attachment plate 309 can be spaced apart from the frame 301, with the first attachment plate 309 defining one or more openings through which the first support shaft 273, the third support shaft 277, and/or the fifth support shaft 281 extend.

FIG. 4 illustrates a side view of the drive apparatus 129 along line 4-4 of FIG. 3. In some embodiments, the first attachment plate 309 can define one or more openings, for example, a first attachment opening 401. In some embodiments, the first attachment plate 309 can receive one or more of the support shafts, for example, the first support shaft 273. For example, the first support shaft 273 can be received within the first attachment opening 401. In some embodiments, the first attachment opening 401 may comprise a cross-sectional size (e.g., diameter in FIG. 4) that may be larger than a cross-sectional size (e.g., diameter in FIG. 4) of the first support shaft 273. The first support shaft 273 can be mounted in the first attachment plate 309 (e.g., horizontally and slidingly mounted), with the first support shaft 273 being movable within the first attachment opening 401 relative to the first attachment plate 309 along a first movement axis 402 along which the first support shaft 273 extends.

In some embodiments, the first support shaft 273 can comprise a first inner end 403 and a first outer end 405, with the first support shaft 273 extending substantially linearly along the first movement axis 402 between the first inner end 403 and the first outer end 405. The first forming roll 117 can be mounted, for example, rotationally mounted, to the first outer end 405 of the first support shaft 273. For example, the first outer end 405 can be attached to the first bearing block 211, for example, by being received within an opening within the first bearing block 211. The first outer end 405 can be attached to the first bearing block 211 in several ways. For example, in some embodiments, the first outer end 405 can be threaded into the opening in the first bearing block 211, with the first outer end 405 comprising a male threading that threadingly engages a female threading in the opening of the first bearing block 211. In some embodiments, the first outer end 405 can be attached by an adhesive and/or a mechanical fastener (e.g., screws, bolts, etc.) to the first bearing block 211. By being attached to the first bearing block 211, the first outer end 405 can cause movement of the first bearing block 211, for example, when the first support shaft 273 moves along the first movement axis 402. The first forming roll 117 can be mounted, for example, rotationally mounted, to the first bearing block 211, with the first forming roll 117 rotatable relative to the first bearing block 211. As such, the first forming roll 117 can be mounted, for example, rotationally mounted, to the first outer end 405 of the first support shaft 273 via the first bearing block 211.

In some embodiments, the first inner end 403 can be attached to the first translational drive apparatus 241, for example, the first end translational drive apparatus 245. The first inner end 403 can be attached to the first end translational drive apparatus 245 in several ways, for example, by mechanical fasteners, welding, adhesives, threading engagement, etc. In some embodiments, the first end translational drive apparatus 245 can output a translational drive force along the first movement axis 402, which can cause movement of the first support shaft 273 along the first movement axis 402 in the first direction 261 and/or the second direction 263. In some embodiments, the first support shaft 273 can extend through the first attachment plate 309 and move along the first movement axis 402 independently of movement, if any, of the first attachment plate 309. In some embodiments, as the first end translational drive apparatus 245 causes the first support shaft 273 to move along the first movement axis 402, the first support shaft 273 can cause corresponding movement of the first bearing block 211 along the first movement axis 402. This movement of the first bearing block 211 can cause movement of the first end 205 of the first forming roll 117, such that the first translational drive apparatus 241 can cause the first end 205 of the first forming roll 117 to move along the first movement axis 251, for example, via the movement of the first support shaft 273 and the first bearing block 211.

In some embodiments, the third support shaft 277 can comprise a third inner end 413 and a third outer end 415, with the third support shaft 277 extending substantially linearly along a third movement axis 417 between the third inner end 413 and the third outer end 415. The second forming roll 119 can be mounted, for example, rotationally mounted, to the third outer end 415 of the third support shaft 277. For example, the third outer end 415 can be attached to the third bearing block 231, for example, by being received within an opening 419 within the third bearing block 231. The third outer end 415 can be attached to the third bearing block 231 in several ways. For example, in some embodiments, the third outer end 415 can be threaded into the opening 419 in the third bearing block 231, with the third outer end 415 comprising a male threading that threadingly engages a female threading in the opening 419 of the third bearing block 231. In some embodiments, the third outer end 415 can be attached by an adhesive and/or a mechanical fastener (e.g., screws, bolts, etc.) to the third bearing block 231. By being attached to the third bearing block 231, the third outer end 415 can cause movement of the third bearing block 231, for example, when the third support shaft 277 moves along the third movement axis 417. The second forming roll 119 can be mounted, for example, rotationally mounted, to the third bearing block 231, with the second forming roll 119 rotatable relative to the third bearing block 231. As such, the second forming roll 119 can be mounted, for example, rotationally mounted, to the third outer end 415 of the third support shaft 277 via the third bearing block 231.

In some embodiments, the third support shaft 277 and the first forming roll 117 (e.g., attached to the first bearing block 211) can move relative to and independent of one another. For example, the third support shaft 277 can move relative to the first forming roll 117 (e.g., attached to the first bearing block 211), while the first forming roll 117 (e.g., attached to the first bearing block 211) can move relative to the third support shaft 277. In some embodiments, the first bearing block 211 can define an opening 421 through which the third support shaft 277 can be received and extend through. In some embodiments, the third support shaft 277 may not be attached to the first bearing block 211, such that the third support shaft 277 and the first bearing block 211 can move independently of one another. For example, the opening 421 in the first bearing block 211 can be larger in cross-sectional size than a cross-sectional size of the third support shaft 277. As a result, movement of the third support shaft 277 along the first direction 261 and/or the second direction 263 may not cause movement of the first bearing block 211. In some embodiments, movement of the first bearing block 211 along the first direction 261 and/or the second direction 263 may not cause movement of the third support shaft 277. In some embodiments, the third inner end 413 can be attached to the first attachment plate 309. The third inner end 413 can be attached to the first attachment plate 309 in several ways, for example, by mechanical fasteners, welding, adhesives, threading engagement, etc. for example, the third inner end 413 can be attached to a first side 423 of the first attachment plate 309.

In some embodiments, the fifth support shaft 281 can comprise a fifth inner end 433 and a fifth outer end 435, with the fifth support shaft 281 extending substantially linearly along a fifth movement axis 437 between the fifth inner end 433 and the fifth outer end 435. The second forming roll 119 can be mounted, for example, rotationally mounted, to the fifth outer end 435 of the fifth support shaft 281. For example, the fifth outer end 435 can be attached to the third bearing block 231, for example, by being received within an opening 441 within the third bearing block 231. The fifth outer end 435 can be attached to the third bearing block 231 in several ways. For example, in some embodiments, the fifth outer end 435 can be threaded into the opening 441 in the third bearing block 231, with the fifth outer end 435 comprising a male threading that threadingly engages a female threading in the opening 441 of the third bearing block 231. In some embodiments, the fifth outer end 435 can be attached by an adhesive and/or a mechanical fastener (e.g., screws, bolts, etc.) to the third bearing block 231. By being attached to the third bearing block 231, the fifth outer end 435 can cause movement of the third bearing block 231, for example, when the fifth support shaft 281 moves along the fifth movement axis 437. The second forming roll 119 can be mounted, for example, rotationally mounted, to the third bearing block 231, with the second forming roll 119 rotatable relative to the third bearing block 231. As such, the second forming roll 119 can be mounted, for example, rotationally mounted, to the fifth outer end 435 of the fifth support shaft 281 via the third bearing block 231.

In some embodiments, the fifth support shaft 281 and the first forming roll 117 (e.g., attached to the first bearing block 211) can move relative to and independent of one another. For example, the fifth support shaft 281 can move relative to the first forming roll 117 (e.g., attached to the first bearing block 211), while the first forming roll 117 (e.g., attached to the first bearing block 211) can move relative to the fifth support shaft 281. In some embodiments, the first bearing block 211 can define an opening 443 through which the fifth support shaft 281 can be received and extend through. In some embodiments, the fifth support shaft 281 may not be attached to the first bearing block 211, such that the fifth support shaft 281 and the first bearing block 211 can move independently of one another. For example, the opening 443 in the first bearing block 211 can be larger in cross-sectional size than a cross-sectional size of the fifth support shaft 281. As a result, movement of the fifth support shaft 281 along the first direction 261 and/or the second direction 263 may not cause movement of the first bearing block 211. In some embodiments, movement of the first bearing block 211 along the first direction 261 and/or the second direction 263 may not cause movement of the fifth support shaft 281. In some embodiments, the fifth inner end 433 can be attached to the first attachment plate 309. The fifth inner end 433 can be attached to the first attachment plate 309 in several ways, for example, by mechanical fasteners, welding, adhesives, threading engagement, etc. for example, the fifth inner end 433 can be attached to the first side 423 of the first attachment plate 309.

In some embodiments, the third support shaft 277 and the fifth support shaft 281 can be positioned on opposing sides of the first support shaft 273, with the third support shaft 277 and the fifth support shaft 281 extending through the first bearing block 211. In some embodiments, the third support shaft 277 and the fifth support shaft 281 can extend a greater distance from the frame 301 than the first support shaft 273, due to the first support shaft 273 being attached to the first bearing block 211. In some embodiments, the third support shaft 277 and the fifth support shaft 281 can be attached to the third bearing block 231 towards a top and a bottom of the third bearing block 231. Movement of the first attachment plate 309 in the first direction 261 or the second direction 263 can cause movement of the third support shaft 277 and the fifth support shaft 281 in the first direction 261 or the second direction 263, respectively, thus causing the first end 225 of the second forming roll 119 to move.

FIG. 5 illustrates a side view of the drive apparatus 129 along line 5-5 of FIG. 2. In some embodiments, the transfer apparatus 271 can comprise a second attachment plate 500 that may be substantially identical to the first attachment plate 309 (e.g., illustrated in FIGS. 3-4). The second attachment plate 500 can define one or more openings, for example, a second attachment opening 501. In some embodiments, the second attachment plate 500 can receive one or more of the support shafts, for example, the second support shaft 275, with the second support shaft 275 received within the second attachment opening 501. In some embodiments, the second attachment opening 501 may comprise a cross-sectional size (e.g., diameter in FIG. 5) that may be larger than a cross-sectional size (e.g., diameter in FIG. 5) of the second support shaft 275. The second support shaft 275 can be mounted in the second attachment plate 500 (e.g., horizontally and slidingly mounted), with the second support shaft 275 being movable within the second attachment opening 501 relative to the second attachment plate 500 along a second movement axis 502 along which the second support shaft 275 extends.

In some embodiments, the second support shaft 275 can comprise a second inner end 503 and a second outer end 505, with the second support shaft 275 extending substantially linearly along the second movement axis 502 between the second inner end 503 and the second outer end 505. The first forming roll 117 can be mounted, for example, rotationally mounted, to the second outer end 505 of the second support shaft 275. For example, the second outer end 505 can be attached to the second bearing block 213, for example, by being received within an opening within the second bearing block 213. The second outer end 505 can be attached to the second bearing block 213 in several ways. For example, in some embodiments, the second outer end 505 can be threaded into the opening in the second bearing block 213, with the second outer end 505 comprising a male threading that threadingly engages a female threading in the opening of the second bearing block 213. In some embodiments, the second outer end 505 can be attached by an adhesive and/or a mechanical fastener (e.g., screws, bolts, etc.) to the second bearing block 213. By being attached to the second bearing block 213, the second outer end 505 can cause movement of the second bearing block 213, for example, when the second support shaft 275 moves along the second movement axis 502. The second forming roll 119 can be mounted, for example, rotationally mounted, to the second bearing block 213, with the second forming roll 119 rotatable relative to the second bearing block 213. As such, the second forming roll 119 can be mounted, for example, rotationally mounted, to the second outer end 505 of the second support shaft 275 via the second bearing block 213.

In some embodiments, the second inner end 503 can be attached to the first translational drive apparatus 241, for example, the second end translational drive apparatus 247. The second inner end 503 can be attached to the second end translational drive apparatus 247 in several ways, for example, by mechanical fasteners, welding, adhesives, threading engagement, etc. In some embodiments, the second end translational drive apparatus 247 can output a translational drive force along the second movement axis 502, which can cause movement of the second support shaft 275 along the second movement axis 502 in the first direction 261 and/or the second direction 263. In some embodiments, the second support shaft 275 can extend through the second attachment plate 500 and move along the second movement axis 502 independently of movement, if any, of the second attachment plate 500. In some embodiments, as the second end translational drive apparatus 247 causes the second support shaft 275 to move along the second movement axis 502, the second support shaft 275 can cause corresponding movement of the second bearing block 213 along the second movement axis 502. This movement of the second bearing block 213 can cause movement of the second end 207 of the first forming roll 117, such that the first translational drive apparatus 241 can cause the second end 207 of the first forming roll 117 to move along the first movement axis 251, for example, via the movement of the first support shaft 273 and the first bearing block 211.

In some embodiments, the fourth support shaft 279 can comprise a fourth inner end 513 and a fourth outer end 515, with the fourth support shaft 279 extending substantially linearly along a fourth movement axis 517 between the fourth inner end 513 and the fourth outer end 515. The second forming roll 119 can be mounted, for example, rotationally mounted, to the fourth outer end 515 of the fourth support shaft 279. For example, the fourth outer end 515 can be attached to the fourth bearing block 233, for example, by being received within an opening 519 within the fourth bearing block 233. The fourth outer end 515 can be attached to the fourth bearing block 233 in several ways. For example, in some embodiments, the fourth outer end 515 can be threaded into the opening 519 in the fourth bearing block 233, with the fourth outer end 515 comprising a male threading that threadingly engages a female threading in the opening 519 of the fourth bearing block 233. In some embodiments, the fourth outer end 515 can be attached by an adhesive and/or a mechanical fastener (e.g., screws, bolts, etc.) to the fourth bearing block 233. By being attached to the fourth bearing block 233, the fourth outer end 515 can cause movement of the fourth bearing block 233, for example, when the fourth support shaft 279 moves along the fourth movement axis 517. The second forming roll 119 can be mounted, for example, rotationally mounted, to the fourth bearing block 233, with the second forming roll 119 rotatable relative to the fourth bearing block 233. As such, the second forming roll 119 can be mounted, for example, rotationally mounted, to the fourth outer end 515 of the fourth support shaft 279 via the fourth bearing block 233.

In some embodiments, the fourth support shaft 279 and the first forming roll 117 (e.g., attached to the second bearing block 213) can move relative to and independent of one another. For example, the fourth support shaft 279 can move relative to the first forming roll 117 (e.g., attached to the second bearing block 213), while the first forming roll 117 (e.g., attached to the second bearing block 213) can move relative to the fourth support shaft 279. In some embodiments, the second bearing block 213 can define an opening 521 through which the fourth support shaft 279 can be received and extend through. In some embodiments, the fourth support shaft 279 may not be attached to the second bearing block 213, such that the fourth support shaft 279 and the second bearing block 213 can move independently of one another. For example, the opening 521 in the second bearing block 213 can be larger in cross-sectional size than a cross-sectional size of the fourth support shaft 279. As a result, movement of the fourth support shaft 279 along the first direction 261 and/or the second direction 263 may not cause movement of the second bearing block 213. In some embodiments, movement of the second bearing block 213 along the first direction 261 and/or the second direction 263 may not cause movement of the fourth support shaft 279. In some embodiments, the fourth inner end 513 can be attached to the second attachment plate 500. The fourth inner end 513 can be attached to the second attachment plate 500 in several ways, for example, by mechanical fasteners, welding, adhesives, threading engagement, etc. for example, the fourth inner end 513 can be attached to a first side 523 of the second attachment plate 500.

In some embodiments, the sixth support shaft 283 can comprise a sixth inner end 533 and a sixth outer end 535, with the sixth support shaft 283 extending substantially linearly along a sixth movement axis 537 between the sixth inner end 533 and the sixth outer end 535. The second forming roll 119 can be mounted, for example, rotationally mounted, to the sixth outer end 535 of the sixth support shaft 283. For example, the sixth outer end 535 can be attached to the fourth bearing block 233, for example, by being received within an opening 541 within the fourth bearing block 233. The sixth outer end 535 can be attached to the fourth bearing block 233 in several ways. For example, in some embodiments, the sixth outer end 535 can be threaded into the opening 541 in the fourth bearing block 233, with the sixth outer end 535 comprising a male threading that threadingly engages a female threading in the opening 541 of the fourth bearing block 233. In some embodiments, the sixth outer end 535 can be attached by an adhesive and/or a mechanical fastener (e.g., screws, bolts, etc.) to the fourth bearing block 233. By being attached to the fourth bearing block 233, the sixth outer end 535 can cause movement of the fourth bearing block 23, for example, when the sixth support shaft 283 moves along the sixth movement axis 537. The second forming roll 119 can be mounted, for example, rotationally mounted, to the fourth bearing block 233, with the second forming roll 119 rotatable relative to the fourth bearing block 233. As such, the second forming roll 119 can be mounted, for example, rotationally mounted, to the sixth outer end 535 of the sixth support shaft 283 via the fourth bearing block 233.

In some embodiments, the sixth support shaft 283 and the first forming roll 117 (e.g., attached to the second bearing block 213) can move relative to and independent of one another. For example, the sixth support shaft 283 can move relative to the first forming roll 117 (e.g., attached to the second bearing block 213), while the first forming roll 117 (e.g., attached to the second bearing block 213) can move relative to the sixth support shaft 283. In some embodiments, the second bearing block 213 can define an opening 543 through which the sixth support shaft 283 can be received and extend through. In some embodiments, the sixth support shaft 283 may not be attached to the second bearing block 213, such that the sixth support shaft 283 and the second bearing block 213 can move independently of one another. For example, the opening 543 in the second bearing block 213 can be larger in cross-sectional size than a cross-sectional size of the sixth support shaft 283. As a result, movement of the sixth support shaft 283 along the first direction 261 and/or the second direction 263 may not cause movement of the second bearing block 213. In some embodiments, movement of the second bearing block 213 along the first direction 261 and/or the second direction 263 may not cause movement of the sixth support shaft 283. In some embodiments, the sixth inner end 533 can be attached to the second attachment plate 500. The sixth inner end 533 can be attached to the second attachment plate 500 in several ways, for example, by mechanical fasteners, welding, adhesives, threading engagement, etc. In some embodiments, the sixth inner end 533 can be attached to the first side 523 of the second attachment plate 500.

In some embodiments, the fourth support shaft 279 and the sixth support shaft 283 can be positioned on opposing sides of the second support shaft 275, with the fourth support shaft 279 and the sixth support shaft 283 extending through the second bearing block 213. In some embodiments, the fourth support shaft 279 and the sixth support shaft 283 can extend a greater distance from the frame 301 than the second support shaft 275, due to the second support shaft 275 being attached to the second bearing block 213. In some embodiments, the fourth support shaft 279 and the sixth support shaft 283 can be attached to the fourth bearing block 233 towards a top and a bottom of the fourth bearing block 233. Movement of the second attachment plate 500 in the first direction 261 or the second direction 263 can cause movement of the fourth support shaft 279 and the sixth support shaft 283 in the first direction 261 or the second direction 263, respectively, thus causing the second end 227 of the second forming roll 119 to move.

Figure 6:
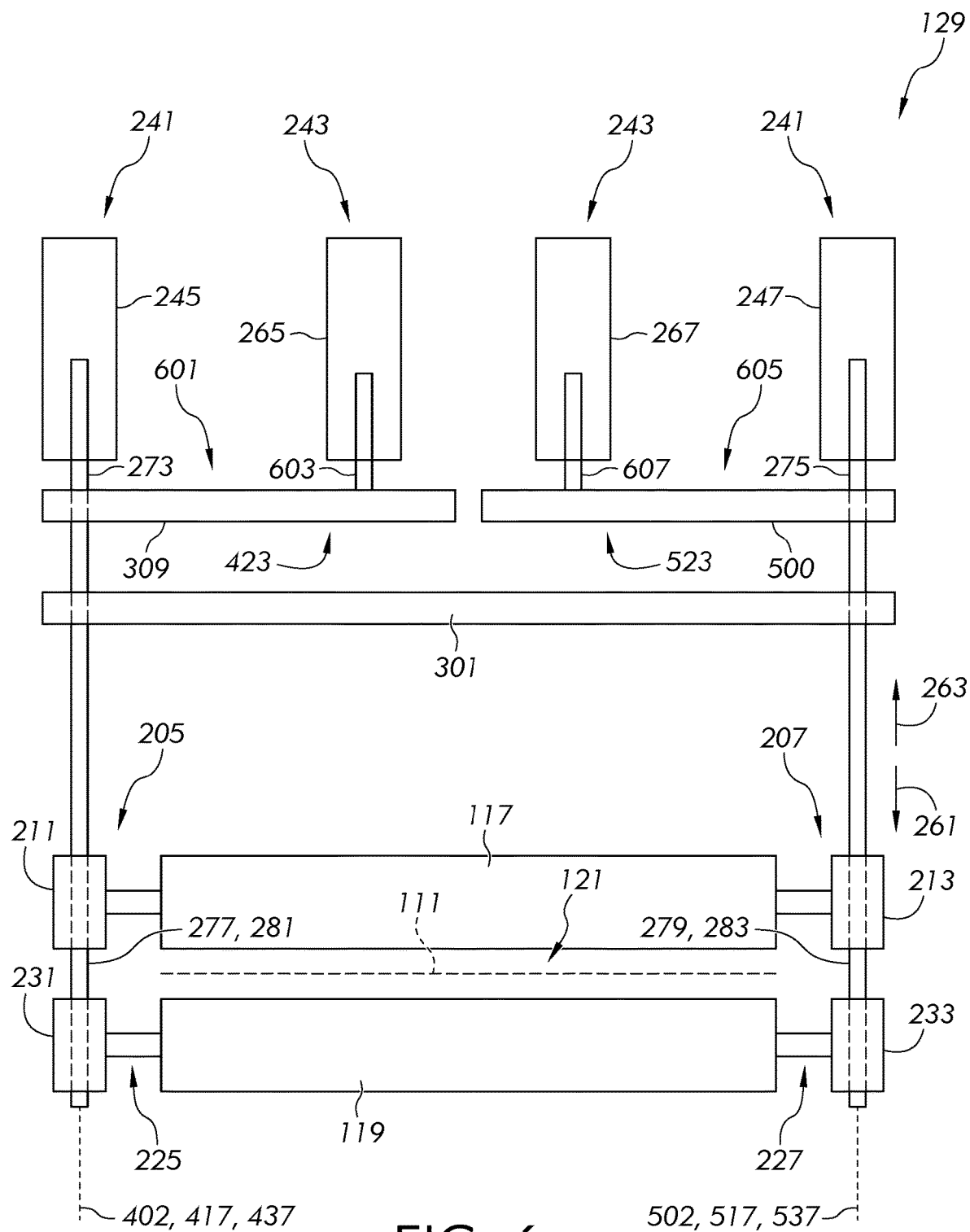
FIG. 6 illustrates a top view of example embodiments of a drive apparatus along line 6-6 of FIG. 4 in accordance with embodiments of the disclosure.

FIG. 6 illustrates a top-down view of the drive apparatus 129 along line 6-6 of FIG. 4. In some embodiments, the drive apparatus 129 can independently control the movement of the first end 205 of the first forming roll 117, the second end 207 of the first forming roll 117, the first end 225 of the second forming roll 119, or the second end 227 of the second forming roll 119 in the first direction 261 and/or the second direction 263. For example, the first attachment plate 309 and the second attachment plate 500 can be spaced apart to define a gap between the first attachment plate 309 and the second attachment plate 500. The first attachment plate 309 and the second attachment plate 500 can move independently of one another, with the first attachment plate 309 movable in the first direction 261 and/or the second direction 263, and the second attachment plate 500 movable, independently of the first attachment plate 309, in the first direction 261 and/or the second direction 263. In some embodiments, the first attachment plate 309 can comprise the first side 423 and an opposing second side 601. The third support shaft 277 and the fifth support shaft 281 can be attached to the first side 423 of the first attachment plate 309 (e.g., illustrated in FIG. 4 with the third inner end 413 of the third support shaft 277 and the fifth inner end 433 of the fifth support shaft 281 attached to the first side 423 of the first attachment plate 309). The second translational drive apparatus 243, for example, the third end translational drive apparatus 265, can be attached to the second side 601 of the first attachment plate 309. In some embodiments, the third end translational drive apparatus 265 can comprise a first drive shaft 603 that may be attached to the second side 601 of the first attachment plate 309. The third end translational drive apparatus 265 can output movement to cause the first drive shaft 603 to move (e.g., in the first direction 261 and/or the second direction 263), which can cause movement of the first attachment plate 309. Due to the attachment of the third support shaft 277 and the fifth support shaft 281 to the first side 423 of the first attachment plate 309, movement of the first attachment plate 309 can cause movement of the third support shaft 277 and the fifth support shaft 281, which can cause corresponding movement of the first end 225 of the second forming roll 119.

In some embodiments, the second attachment plate 500 can comprise the first side 523 and an opposing second side 605. The fourth support shaft 279 and the sixth support shaft 283 can be attached to the first side 523 of the second attachment plate 500 (e.g., illustrated in FIG. 5 with the fourth inner end 513 of the fourth support shaft 279 and the sixth inner end 533 of the sixth support shaft 283 attached to the first side 523 of the second attachment plate 500). The second translational drive apparatus 243, for example, the fourth end translational drive apparatus 267, can be attached to the second side 605 of the second attachment plate 500. In some embodiments, the fourth end translational drive apparatus 267 can comprise a second drive shaft 607 that may be attached to the second side 605 of the second attachment plate 500. The fourth end translational drive apparatus 267 can output movement to cause the second drive shaft 607 to move (e.g., in the first direction 261 and/or the second direction 263), which can cause movement of the second attachment plate 500. Due to the attachment of the fourth support shaft 279 and the sixth support shaft 283 to the first side 523 of the second attachment plate 500, movement of the second attachment plate 500 can cause movement of the fourth support shaft 279 and the sixth support shaft 283, which can cause corresponding movement of the second end 227 of the second forming roll 119.

Figure 7:
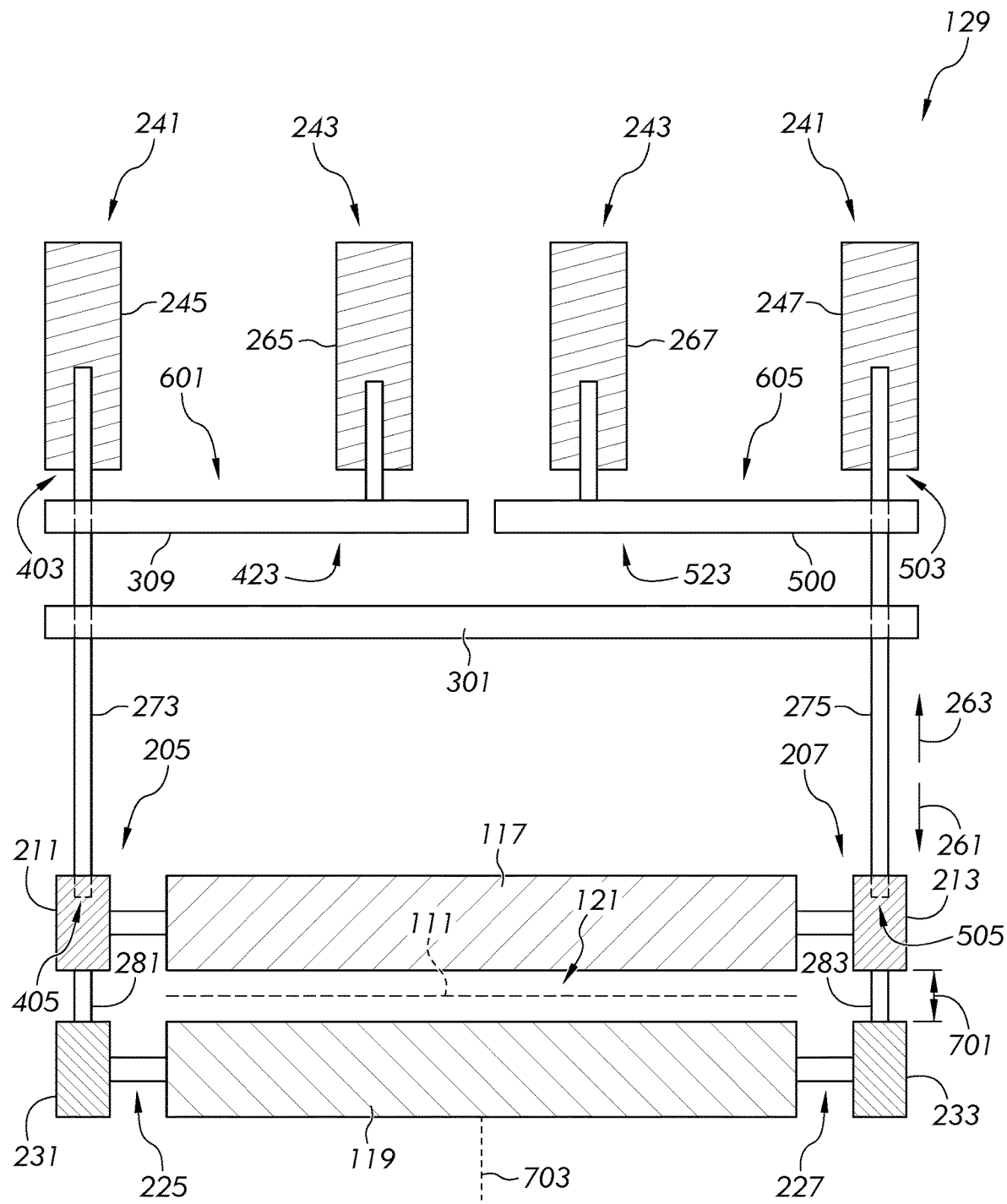
FIG. 7 illustrates a top view of example embodiments of a drive apparatus along line 7-7 of FIG. 4 in which a first forming roll is movable relative to a second forming roll in accordance with embodiments of the disclosure.

FIG. 7 illustrates a top-down view of the drive apparatus 129 along line 7-7 of FIG. 4. In some embodiments, methods of manufacturing a glass ribbon can comprise changing a width 701 of the gap 121 by moving one or more of the first forming roll 117 independently of the second forming roll 119 along a movement axis 703 that may be substantially perpendicular to the travel path 111 or the second forming roll 119 independently of the first forming roll 117 along the movement axis 703 to change the width 701 of the gap 121. In some embodiments, the drive apparatus 129 can move one or more of the first forming roll 117 independently of the second forming roll 119 or the second forming roll 119 independently of the first forming roll 117 to change the width 701 of the gap 121. For example, the first translational drive apparatus 241 can move the first end 205 and/or the second end 207 of the first forming roll 117 independently of the second translational drive apparatus 243 moving the first end 225 and/or the second end 227 of the second forming roll 119. The first support shaft 273 can be attached to the first bearing block 211 and the first end translational drive apparatus 245, for example, with the first outer end 405 of the first support shaft 273 attached to the first bearing block 211 and the first inner end 403 of the first support shaft 273 attached to the first end translational drive apparatus 245. In some embodiments, the first support shaft 273 can extend through openings in the frame 301 and the first attachment plate 309 (e.g., also illustrated in FIG. 4), such that the first support shaft 273 may move independently of the frame 301 and the first attachment plate 309. In some embodiments, the first end translational drive apparatus 245 can output movement to cause the first support shaft 273 to move (e.g., in the first direction 261 and/or the second direction 263). Movement of the first support shaft 273 can cause movement of the first bearing block 211 (e.g., in the first direction 261 and/or the second direction 263), which can increase or decrease the width 701 of the gap 121 at the first end 205 of the first forming roll 117.

In some embodiments, for example, when the first translational drive apparatus 241 comprises a plurality of drive apparatuses (e.g., the first end translational drive apparatus 245 and the second end translational drive apparatus 247), the first end 205 of the first forming roll 117 and the second end 207 of the first forming roll 117 can move independently of one another. For example, the second support shaft 275 can be attached to the second bearing block 213 and the second end translational drive apparatus 247, for example, with the second outer end 505 of the second support shaft 275 attached to the second bearing block 213 and the second inner end 503 of the second support shaft 275 attached to the first end translational drive apparatus 245. In some embodiments, the second support shaft 275 can extend through openings in the frame 301 and the second attachment plate 500 (e.g., also illustrated in FIG. 5), such that the second support shaft 275 may move independently of the frame 301 and the second attachment plate 500. In some embodiments, the second end translational drive apparatus 247 can output movement to cause the second support shaft 275 to move (e.g., in the first direction 261 and/or the second direction 263). Movement of the second support shaft 275 can cause movement of the second bearing block 213 (e.g., in the first direction 261 and/or the second direction 263), which can increase or decrease the width 701 of the gap 121 at the second end 207 of the first forming roll 117.

In some embodiments, the first end translational drive apparatus 245 and the second end translational drive apparatus 247 can operate independently of one another, such that the movement of the first end 205 and the second end 207 of the first forming roll 117 may be independent of one another. For example, in some embodiments, to decrease the width 701 of the gap 121, the first end translational drive apparatus 245 can move the first support shaft 273 in the first direction 261 while the second end translational drive apparatus 247 can move the second support shaft 275 in the first direction 261, which can move the first forming roll 117 towards from the second forming roll 119. In some embodiments, to increase the width 701 of the gap 121, the first end translational drive apparatus 245 can move the first support shaft 273 in the second direction 263 while the second end translational drive apparatus 247 can move the second support shaft 275 in the second direction 263, which can move the first forming roll 117 away from the second forming roll 119. In some embodiments, a diameter of the first forming roll 117 may not be constant along a length of the first forming roll 117, such that one end of the first forming roll 117 may be spaced a different distance from the second forming roll 119 than the opposing end of the first forming roll 117. To accommodate for differences in the diameter of the first forming roll 117, in some embodiments, one end (e.g., the first end 205 or the second end 207) of the first forming roll 117 can be moved in the first direction 261 and/or the second direction 263 while the opposing end of the first forming roll 117 may remain stationary. As such, the first translational drive apparatus 241 can move one or more of the first end 205 or the second end 207 of the first forming roll 117 along the movement axis 703 that may be substantially perpendicular to the travel path 111.

Figure 8:
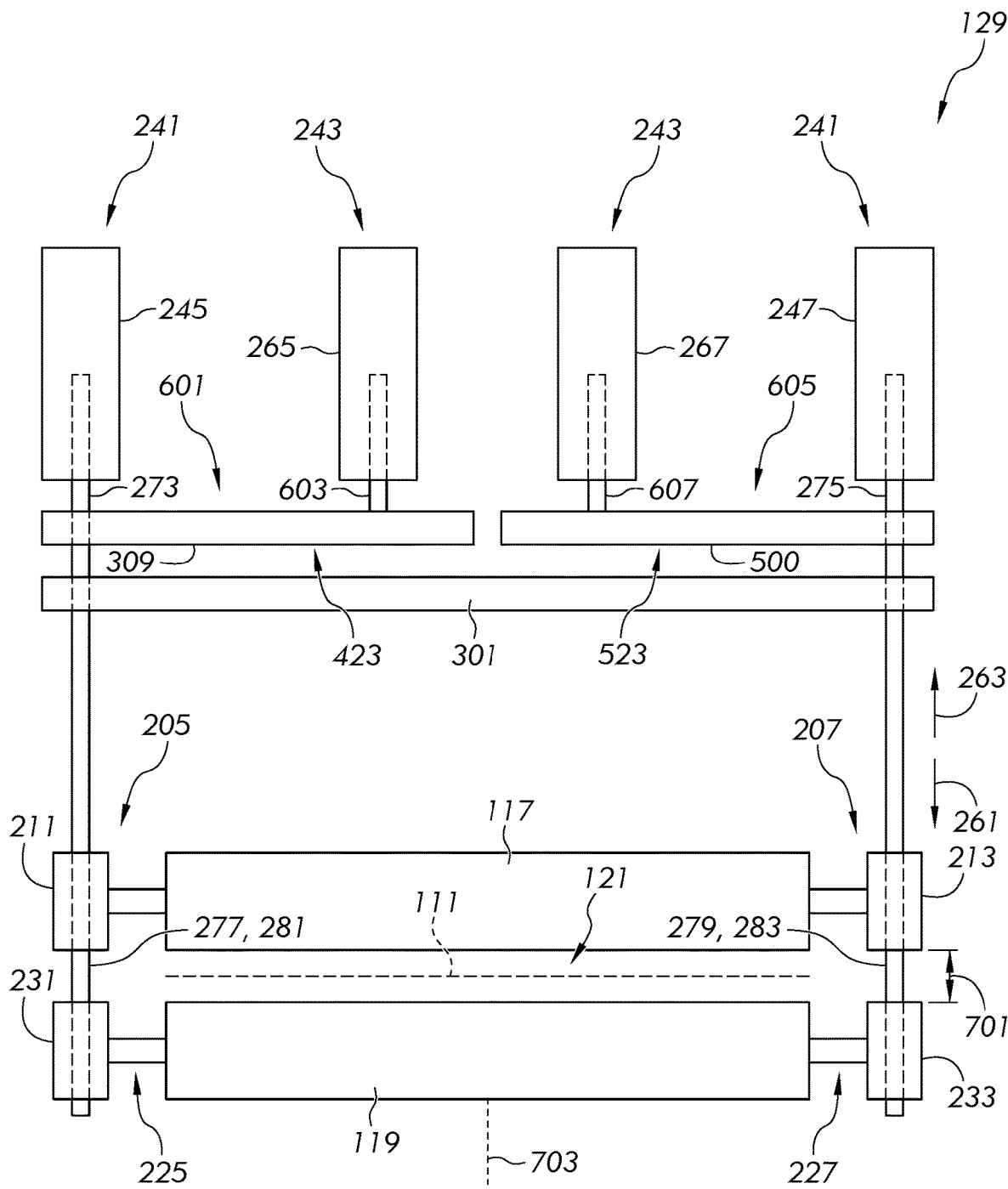
FIG. 8 illustrates a top view of example embodiments of a drive apparatus similar to FIG. 6 in which a second forming roll is movable relative to a first forming roll in accordance with embodiments of the disclosure.

FIG. 8 illustrates a top-down view of the drive apparatus 129 similar to FIG. 6 along line 6-6 of FIG. 4. In some embodiments, changing the width 701 of the gap 121 is not limited to moving the first forming roll 117 independently of the second forming roll 119 along the movement axis 703 that is substantially perpendicular to the travel path 111. Rather, in some embodiments, methods of manufacturing a glass ribbon can comprise moving the second forming roll 119 independently of the first forming roll 117 along the movement axis 703. For example, the second translational drive apparatus 243 can move the first end 225 and/or the second end 227 of the second forming roll 119 independently of the first translational drive apparatus 241 that moves the first end 205 and/or the second end 207 of the first forming roll 117. The third support shaft 277 and the fifth support shaft 281 can be attached to the third bearing block 231 and the third end translational drive apparatus 265. In some embodiments, the third support shaft 277 and the fifth support shaft 281 can extend through openings in the frame 301 and can be attached to the first side 423 of the first attachment plate 309 (e.g., also illustrated in FIG. 4), such that the third support shaft 277 and the fifth support shaft 281 can move independently of the frame 301. In some embodiments, the third end translational drive apparatus 265 can output movement to cause the third support shaft 277 and the fifth support shaft 281 to move (e.g., in the first direction 261 and/or the second direction 263). Movement of the third support shaft 277 and the fifth support shaft 281 can cause movement of the third bearing block 231 (e.g., in the first direction 261 and/or the second direction 263), which can increase or decrease the width 701 of the gap 121 at the first end 225 of the second forming roll 119.

In some embodiments, for example, when the second translational drive apparatus 243 comprises a plurality of drive apparatuses (e.g., the third end translational drive apparatus 265 and the fourth end translational drive apparatus 267), the first end 225 of the second forming roll 119 and the second end 227 of the second forming roll 119 can move independently of one another. For example, the fourth support shaft 279 and the sixth support shaft 283 can be attached to the fourth bearing block 233 and the fourth end translational drive apparatus 267. In some embodiments, the fourth support shaft 279 and the sixth support shaft 283 can extend through openings in the frame 301 (e.g., also illustrated in FIG. 5), such that the fourth support shaft 279 and the sixth support shaft 283 may move independently of the frame 301. In some embodiments, the fourth end translational drive apparatus 267 can output movement to cause the fourth support shaft 279 and the sixth support shaft 283 to move (e.g., in the first direction 261 and/or the second direction 263). Movement of the fourth support shaft 279 and the sixth support shaft 283 can cause movement of the fourth bearing block 233 (e.g., in the first direction 261 and/or the second direction 263), which can increase or decrease the width 701 of the gap 121 at the second end 227 of the second forming roll 119.

In some embodiments, the third end translational drive apparatus 265 and the fourth end translational drive apparatus 267 can operate independently of one another, such that the movement of the first end 225 and the second end 227 of the second forming roll 119 may be independent of one another. For example, in some embodiments, to decrease the width 701 of the gap 121, the third end translational drive apparatus 265 can move the third support shaft 277 and the fifth support shaft 281 in the second direction 263 while the fourth end translational drive apparatus 267 can move the fourth support shaft 279 and the sixth support shaft 283 in the second direction 263, which can move the second forming roll 119 towards the first forming roll 117. In some embodiments, to increase the width 701 of the gap 121, the third end translational drive apparatus 265 can move the third support shaft 277 and the fifth support shaft 281 in the first direction 261 while the fourth end translational drive apparatus 267 can move the fourth support shaft 279 and the sixth support shaft 283 in the first direction 261, which can move the second forming roll 119 away from the first forming roll 117. In some embodiments, a diameter of the second forming roll 119 may not be constant along a length of the second forming roll 119, such that one end of the second forming roll 119 may be spaced a different distance from the first forming roll 117 than the opposing end of the second forming roll 119. To accommodate for differences in the diameter of the second forming roll 119, in some embodiments, one end (e.g., the first end 225 or the second end 227) of the second forming roll 119 can be moved in the first direction 261 and/or the second direction 263 while the opposing end of the second forming roll 119 may remain stationary. As such, the second translational drive apparatus 243 can move one or more of the first end 225 or the second end 227 of the second forming roll 119 along the movement axis 703.

In some embodiments, methods of manufacturing the glass ribbon can comprise changing the width 701 of the gap 121 by moving one or more of the first forming roll 117 independently of the second forming roll 119 along the movement axis that is substantially perpendicular to the travel path or the second forming roll independently of the first forming roll along the movement axis 703 that is substantially perpendicular to the travel path 111 or the second forming roll 119 independently of the first forming roll 117 along the movement axis 703. For example, the first translational drive apparatus 241 can control the movement of the first forming roll 117 while the second translational drive apparatus 243 can control movement of the second forming roll 119. In some embodiments, the first translational drive apparatus 241 can move the first forming roll 117 independently of the second forming roll 119. In some embodiments, the second translational drive apparatus 243 can move the second forming roll 119 independently of the first forming roll 117.

In some embodiments, changing the width 701 of the gap 121 can comprise moving one end of the first forming roll 117 to accommodate for a variation in the width 701 of the gap 121 along the length of the gap 121. For example, the first translational drive apparatus 241 can comprise the first end translational drive apparatus 245 and the second end translational drive apparatus 247, wherein the first end translational drive apparatus 245 can control movement of the first end 205 of the first forming roll 117, while the second end translational drive apparatus 247 can control movement of the second end 207 of the first forming roll 117. In some embodiments, the first end translational drive apparatus 245 and the second end translational drive apparatus 247 can work independently of one another, such that the first end 205 and the second end 207 can be adjusted independently of one another. As such, one end of the first forming roll 117 can be moved to accommodate for variations in the width 701 of the gap 121 along the length of the gap 121. For example, due to the geometry of the first forming roll 117 and/or the second forming roll 119, the width 701 of the gap 121 at the first end 205 may be greater than the width 701 of the gap 121 at the second end 207. To accommodate for this variation in the width 701, the first end translational drive apparatus 245 can move the first end 205 closer to the second forming roll 119 (e.g., in the first direction 261), thus reducing the variation in the width 701.

In addition, or in the alternative, the second end translational drive apparatus 247 can move the second end 207 away from the second forming roll 119 (e.g., in the second direction 263), thus reducing the variation in the width 701. In some embodiments, changing the width 701 of the gap 121 can occur as the glass ribbon 105 (e.g., illustrated in FIG. 1) is received within the gap 121. For example, the first translational drive apparatus 241 can comprise one or more servo motors, which can facilitate movement and positional adjustment of the first forming roll 117 during operation and without stopping production.

Figure 9:
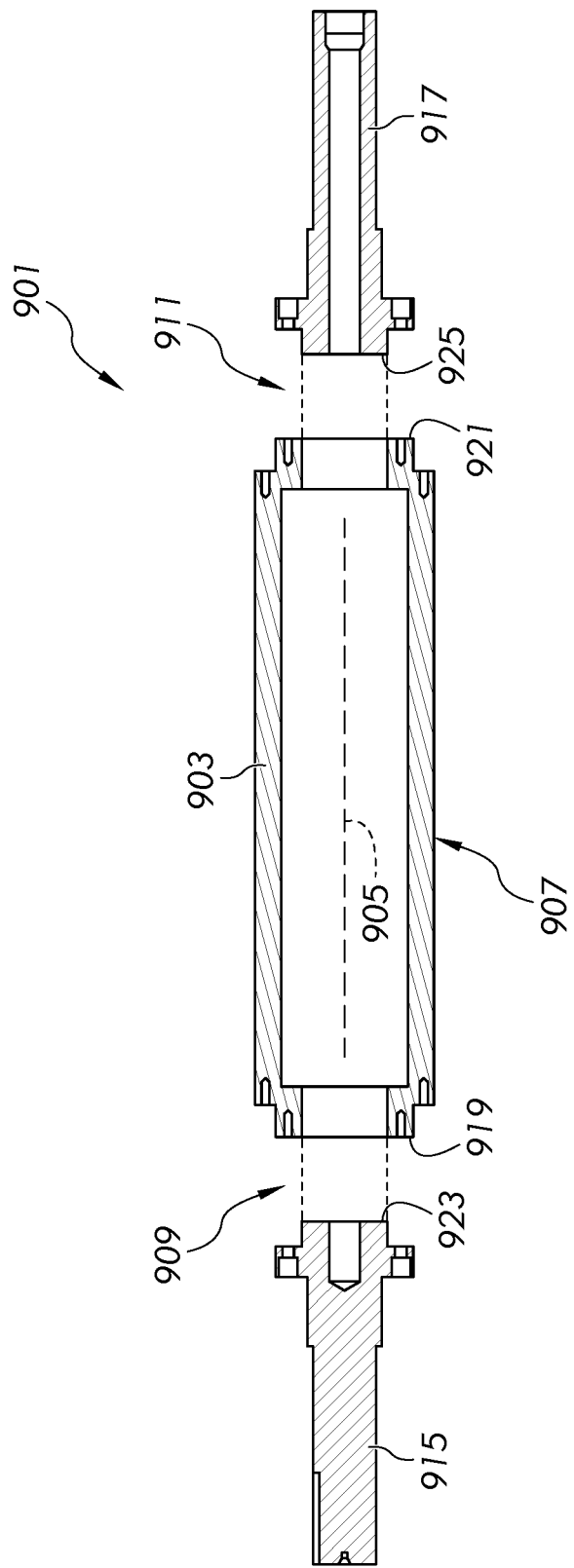
FIG. 9 illustrates an exploded view of example embodiments of a forming roll in accordance with embodiments of the disclosure.

FIG. 9 illustrates an exploded view of a forming roll 901, for example, the first forming roll 117 or the second forming roll 119. In some embodiments, the forming roll 901 may be substantially identical to the first forming roll 117 and/or the second forming roll (e.g., illustrated in FIGS. 1-8). In some embodiments, the forming roll 901 can comprise a roller 903, for example, an insulating cylinder or coating. In some embodiments, the roller 903 can comprise one or more of a stainless-steel material, an Inconel material, or a ceramic coated stainless-steel material. In some embodiments, the roller 903 can comprise a ceramic coating, a sleeve, or other ceramic base materials, for example, zirconia. In some embodiments, the roller 903 can be substantially hollow and may comprise a substantially circular cross-section, for example, a diameter. The roller 903 can extend along a forming axis 905 and may comprise an outer radial surface 907. In some embodiments, the outer radial surface 907 can comprise a constant diameter along the forming axis 905 between a first end 909 and a second end 911.

In some embodiments, the forming roll 901 can comprise one or more shafts, for example, a first shaft 915 and a second shaft 917. The first shaft 915 can be attached to a first side 919 of the roller 903 while the second shaft 917 can be attached to a second side 921 of the roller 903. In some embodiments, methods of manufacturing a glass ribbon can comprise assembling the forming roll 901 (e.g., assembling the first forming roll 117 and the second forming roll 119). For example, assembling the forming roll 901 can comprise attaching the first shaft 915 to the first side 919 of the roller 903 and the second shaft 917 to the second side 921 of the roller 903 to form the forming roll 901. In some embodiments, the first shaft 915 can comprise a first end cap 923 that can engage with (e.g., contact, be received within, etc.) the first end 909 of the roller 903. The second shaft 917 can comprise a second end cap 925 that can engage with (e.g., contact, be received within, etc.) the second end 911 of the roller 903. In some embodiments, the forming roll 901 can comprise one or more fasteners (e.g., screws, bolts, adhesives, etc.) that can attach the first shaft 915 and the second shaft 917 to the roller 903. The fasteners can maintain the first shaft 915 and the second shaft 917 in attachment to the roller 903 and limit inadvertent detachment of the first shaft 915 or the second shaft 917 from the roller 903.

FIG. 10 illustrates the forming roll 901 following the assembly of the forming roll 901 by attaching the first shaft 915 and the second shaft 917 to the roller 903. After the assembling of the forming roll 901 (e.g., the first forming roll 117 and the second forming roll 119), methods of manufacturing a glass ribbon can comprise machining one or more surfaces of the forming roll 901 (e.g., the first forming roll 117 and the second forming roll 119) to reduce a variation in the width (e.g., width 701 illustrated in FIGS. 7-8) of the gap (e.g., gap 121 illustrated in FIGS. 6-8) defined between the first forming roll 117 and the second forming roll 119. For example, it is beneficial for the width 701 of the gap 121 to be substantially constant along a length of the forming roll 901 (e.g., the first forming roll 117 and the second forming roll 119 illustrated in FIGS. 6-8). To maintain a substantially constant width 701, accurate dimensions of the roller 903, the first shaft 915, and the second shaft 917 may reduce variations in the width 701 of the gap 121. However, even if relatively accurate dimensions of the dimensions of the roller 903, the first shaft 915, and the second shaft 917 are obtained, there may still be variations in dimensions caused by the assembly of the forming roll 901. To reduce these variations, the forming roll 901 can be machined (e.g., with the machining 1001 illustrated schematically with arrows). For example, the machining 1001 can occur after the assembling of the forming roll 901 (e.g., the first forming roll 117 and the second forming roll 119), wherein the machining 1001 can comprise grinding, cutting, etc. the one or more surfaces of the forming roll 901. In some embodiments, the one or more surfaces of the forming roll 901 can comprise, for example, a surface of the first shaft 915, a surface of the second shaft 917, and/or an outer radial surface 907 of the roller 903.

Referring to FIG. 11, in some embodiments, the assembling the forming roll 901 can comprise attaching the first shaft 915 to a first bearing 1101 of a first bearing block 1103 and the second shaft 917 to a second bearing 1105 of a second bearing block 1107. In some embodiments, the first bearing block 1103 and the second bearing block 1107 may be substantially identical to one or more of the first bearing block 211, the second bearing block 213, the third bearing block 231, or the fourth bearing block 233 (e.g., illustrated in FIG. 2). The first bearing 1101 can be received within the first bearing block 1103, with the first bearing 1101 defining an opening through which the first shaft 915 can be received. In some embodiments, the first bearing 1101 can facilitate rotation of the first shaft 915 relative to the first bearing block 1103. The second bearing 1105 can be received within the second bearing block 1107, with the second bearing 1105 defining an opening through which the second shaft 917 can be received. In some embodiments, the second bearing 1105 can facilitate rotation of the second shaft 917 relative to the second bearing block 1107. In some embodiments, the machining (e.g., illustrated in FIG. 10) of the forming roll 901 can occur prior to or after the attaching of the first shaft 915 to the first bearing block 1103 and the second shaft 917 to the second bearing block 1107. In some embodiments, to accommodate for thermal expansion during operation, one or more of the first bearing 1101 or the second bearing 1105 can be movable relative to the first bearing block 1103 or the second bearing block 1107, respectively. For example, the first bearing 1101 can be movable relative to the first bearing block 1103 in the first direction 1111 and/or the second direction 1113, wherein the first direction 1111 and the second direction 1113 may be substantially parallel to the forming axis 905. In addition, or in the alternative, in some embodiments, the second bearing 1105 can be movable relative to the second bearing block 1107 in the first direction 1111 and/or the second direction 1113. In some embodiments, the first bearing 1101 and the second bearing 1105 are not limited to facilitating movement along the forming axis 905 (e.g., in the first direction 1111 and/or the second direction 1113) and about the forming axis (e.g., when the first shaft 915 and the second shaft 917 rotate). Rather, in some embodiments, the first bearing 1101 and/or the second bearing 1105 may be pivotable relative to the first bearing block 1103 and the second bearing block 1107, respectively. For example, in some embodiments, the first bearing 1101 may be pivotable relative to the first bearing block 1103 and/or the second bearing 1105 may be pivotable relative to the second bearing block 1107. The pivoting of the first bearing 1101 and/or the second bearing 1105 can facilitate movement of the forming roll 901, for example, when a first end 909 is moved independently of the second end 911, or when the second end 911 is moved independently of the first end 909.

In some embodiments, the glass manufacturing apparatus 100 can provide several benefits associated with manufacturing the glass ribbon 123. For example, one or more of the first translational drive apparatus 241 or the second translational drive apparatus 243 can comprise a servo motor, while the other of the first translational drive apparatus 241 or the second translational drive apparatus 243 can comprise a pneumatic cylinder or a servo motor. With the first translational drive apparatus 241 and/or the second translational drive apparatus 243 comprising the servo motor, more incremental control of the movement and position of the first forming roll 117 and the second forming roll 119 can be achieved, thus facilitating a more accurate gap width between the first forming roll 117 and the second forming roll 119. Similarly, the servo motor can facilitate positional adjustment of the first forming roll 117 and/or the second forming roll 119 during operation of the glass manufacturing apparatus 100. For example, the servo motors can adjust the position of the first forming roll 117 relative to the second forming roll 119 and/or the position of the second forming roll 119 relative to the first forming roll 117 while the glass manufacturing apparatus 100 is in operation and the glass ribbon 105 is being delivered to the first forming roll 117 and the second forming roll 119, thus reducing downtime and increasing efficiency. In some embodiments, when the second translational drive apparatus 243 comprises the pneumatic cylinder, the second forming roll 119 can allow for a solidified piece of material to pass through the gap 121 between the first forming roll 117 and the second forming roll 119 by moving away from the first forming roll 117, which can reduce the likelihood of damage to the first forming roll 117 and the second forming roll 119.

In addition, or in the alternative, the drive apparatus 129 can facilitate a more accurate gap width between the first forming roll 117 and the second forming roll 119. For example, when the first translational drive apparatus 241 comprises the first end translational drive apparatus 245 and the second end translational drive apparatus 247, the first end 205 and the second end 207 of the first forming roll 117 can be moved independently of one another. This independent movement can facilitate adjustment of the gap width along the length of the first forming roll 117, which may be beneficial when the first forming roll 117 and/or the second forming roll 119 comprise variations in cross-sectional size. Similarly, when the second translational drive apparatus 243 comprises the third end translational drive apparatus 265 and the fourth end translational drive apparatus 267, the first end 225 and the second end 227 of the second forming roll 119 can be moved independently of one another. This independent movement can facilitate adjustment of the gap width along the length of the second forming roll 119, which may be beneficial when the first forming roll 117 and/or the second forming roll 119 comprise variations in cross-sectional size. To reduce variations in cross-sectional size of the forming rolls 117, 119, one or more surfaces of the forming rolls 117, 119 can be machined following assembly of the forming rolls 117, 119, wherein the machining can reduce a variation in the width of the gap 121 defined between the first forming roll 117 and the second forming roll 119.

As used herein the terms "the," "a," or "an," mean "one or more," and should not be limited to "only one" unless explicitly indicated to the contrary. Thus, for example, reference to "a component" includes embodiments having two or more such components unless the context clearly indicates otherwise.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." It will be further understood that the endpoints of each of the ranges are significant both in relation to the other endpoint, and independently of the other endpoint.

The terms "substantial," "substantially," and variations thereof as used herein are intended to note that a described feature is equal or approximately equal to a value or description. For example, a "substantially planar" surface is intended to denote a surface that is planar or approximately planar. Moreover, as defined above, "substantially similar" is intended to denote that two values are equal or approximately equal. In some embodiments, "substantially similar" may denote values within about 10% of each other, for example within about 5% of each other, or within about 2% of each other.

As used herein, the terms "comprising" and "including," and variations thereof shall be construed as synonymous and open-ended, unless otherwise indicated.

While various embodiments have been described in detail relative to certain illustrative and specific embodiments thereof, the present disclosure should not be considered limited to such, as numerous modifications and combinations of the disclosed features are envisioned without departing from the scope of the following claims.

What is claimed is:

1. A glass manufacturing apparatus comprising:
   a delivery apparatus defining a travel path extending in a travel direction, the delivery apparatus configured to convey a glass ribbon along the travel path in the travel direction of the delivery apparatus;
   a first forming roll;
   a second forming roll spaced apart from the first forming roll to define a gap, the first forming roll and the second forming roll configured to receive the glass ribbon along the travel path within the gap; and
   a drive apparatus coupled to the first forming roll and the second forming roll, the drive apparatus configured to move one or more of the first forming roll independently of the second forming roll or the second forming roll independently of the first forming roll to change a width of the gap, the drive apparatus comprising a first translational drive apparatus and a second translational drive apparatus; and
   a transfer apparatus comprising:
      a first support shaft comprising a first inner end and a first outer end, and a second support shaft comprising a second inner end and a second outer end, the first forming roll mounted to the first outer end of the first support shaft and the second outer end of the second support shaft, and wherein the first inner end and the second inner end are attached to the first translational drive apparatus such that that the first translational drive apparatus is configured to move the first support shaft and the second support shaft;
      a third support shaft comprising a third inner end and a third outer end, and a fourth support shaft comprising a fourth inner end and a fourth outer end, the second forming roll mounted to the third outer end of the third support shaft and the fourth outer end of the fourth support shaft, and wherein the third inner end and the fourth inner end are attached to the second translational drive apparatus such that that the second translational drive apparatus is configured to move the third support shaft and the fourth support shaft;
      a first attachment plate, the third inner end attached to a first side of the first attachment plate and the second translational drive apparatus attached to a second side of the first attachment plate, the second translational drive apparatus configured to move the first attachment plate and the third support shaft along the movement axis; and
      a second attachment plate, the fourth inner end attached to a first side of the second attachment plate and the second translational drive apparatus attached to a second side of the second attachment plate, the second translational drive apparatus configured to move the second attachment plate and the fourth support shaft along the movement axis, the second attachment plate spaced apart from, and configured to move independently of, the first attachment plate.

2. The glass manufacturing apparatus of claim 1, wherein the first translational drive apparatus is configured to move one or more of a first end or a second end of the first forming roll along a movement axis that is substantially perpendicular to the travel path, the second translational drive apparatus is configured to move one or more of a first end or a second end of the second forming roll along the movement axis.

3. The glass manufacturing apparatus of claim 2, wherein the first forming roll comprises a first outer radial surface that extends about a first forming axis between the first end and the second end of the first forming roll, the first outer radial surface comprising a constant diameter along the first forming axis between the first end and the second end of the first forming roll.

4. The glass manufacturing apparatus of claim 2, wherein the second forming roll comprises a second outer radial surface that extends about a second forming axis between the first end and the second end of the second forming roll, the second outer radial surface comprising a constant diameter along the second forming axis between the first end and the second end of the second forming roll.

5. The glass manufacturing apparatus of claim 2, wherein the second translational drive apparatus is spaced a distance apart from the first translational drive apparatus.

6. The glass manufacturing apparatus of claim 5, wherein the third inner end and the fourth inner end are not attached to the first translational drive apparatus.

7. The glass manufacturing apparatus of claim 6, wherein the first attachment plate comprises a first attachment opening through which the first support shaft extends, the third support shaft not extending through the first attachment plate.

8. The glass manufacturing apparatus of claim 7, wherein the first support shaft and the second support shaft move along the movement axis independently of the movement of the first attachment plate and the second attachment plate, and wherein the first outer end and the second outer end are configured to move independently of one another, and wherein the third outer end and the fourth outer end are configured to move independently of one another.

9. The glass manufacturing apparatus of claim 2, wherein the first translational drive apparatus comprises a servo motor.

10. The glass manufacturing apparatus of claim 2, wherein the second translational drive apparatus comprises one or more of a pneumatic cylinder or a servo motor.

11. A glass manufacturing apparatus comprising:
a delivery apparatus defining a travel path extending in a travel direction, the delivery apparatus configured to convey a glass ribbon along the travel path in the travel direction of the delivery apparatus;
a first forming roll;
a second forming roll spaced apart from the first forming roll to define a gap, the first forming roll and the second forming roll configured to receive the glass ribbon along the travel path within the gap; and
a drive apparatus coupled to the first forming roll and the second forming roll, the drive apparatus configured to move the first forming roll independently of the second forming roll and the second forming roll independently of the first forming roll to change a width of the gap, and wherein the first forming roll is configured to move relative to the second forming roll while the second forming roll remains stationary, and wherein the second forming roll is configured to move relative to the first forming roll while the first forming roll remains stationary.

12. A glass manufacturing apparatus comprising:
a delivery apparatus defining a travel path extending in a travel direction, the delivery apparatus configured to convey a glass ribbon along the travel path in the travel direction of the delivery apparatus;
a first forming roll;
a second forming roll spaced apart from the first forming roll to define a gap, the first forming roll and the second forming roll configured to receive the glass ribbon along the travel path within the gap; and
a drive apparatus coupled to the first forming roll and the second forming roll, the drive apparatus configured to move the first forming roll and the second forming roll to change a width of the gap, the drive apparatus comprising:
a first translational drive apparatus coupled to the first forming roll and configured to move the first forming roll relative to the second forming roll, wherein the first translational drive apparatus is attached to a first support shaft that is attached to the first forming roll, the first translational drive apparatus configured to move the first support shaft; and
a second translational drive apparatus coupled to the second forming roll and configured to move the second forming roll relative to the first forming roll, the second translational drive apparatus spaced apart from the first translational drive apparatus, wherein the second translational drive apparatus is attached to a third support shaft that is attached to the second forming roll, the second translational drive apparatus configured to move the third support shaft, and wherein the third support shaft is not attached to the first translational drive apparatus.

* * * * *